US007974816B2

United States Patent
Resende et al.

(10) Patent No.: US 7,974,816 B2
(45) Date of Patent: *Jul. 5, 2011

(54) SENSOR REGISTRATION BY GLOBAL OPTIMIZATION PROCEDURES

(75) Inventors: Mauricio Guilherme de Carvalho Resende, Holmdel, NJ (US); Michael Jacob Hirsch, Oldsmar, FL (US); Panagote Miltiades Pardalos, Gainesville, FL (US)

(73) Assignees: AT&T Intellectual Property II, L.P., Reno, NV (US); Raytheon Company, Waltham, MA (US); University of Florida Research Foundation, Inc., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/629,377

(22) Filed: Dec. 2, 2009

(65) Prior Publication Data

US 2010/0076726 A1   Mar. 25, 2010

Related U.S. Application Data

(63) Continuation of application No. 11/821,041, filed on Jun. 20, 2007, now Pat. No. 7,653,513.

(51) Int. Cl.
  *G06F 17/40* (2006.01)
  *G06F 17/00* (2006.01)
(52) U.S. Cl. ......... 702/189; 702/104; 702/127; 702/181
(58) Field of Classification Search ............... 702/189, 702/104, 127, 181
  See application file for complete search history.

(56) References Cited

U.S. PATENT DOCUMENTS

| | | | | |
|---|---|---|---|---|
| 5,960,097 | A * | 9/1999 | Pfeiffer et al. | 382/103 |
| 6,922,493 | B2 * | 7/2005 | Stanek | 382/293 |
| 7,065,465 | B2 * | 6/2006 | Chen et al. | 702/116 |
| 7,266,477 | B2 * | 9/2007 | Foessel | 702/189 |
| 7,340,380 | B2 * | 3/2008 | Klotz et al. | 702/189 |
| 7,653,513 | B2 * | 1/2010 | Resende et al. | 702/189 |

* cited by examiner

Primary Examiner — Hal D Wachsman

(57) ABSTRACT

Disclosed are method and apparatus for registering multiple sensors collecting data from multiple objects. Sensor registration is decomposed into a two-step procedure. The first step corrects systematic errors. The second step assigns objects measured by one sensor to objects measured by a second sensor. Systematic errors are corrected by generating the global minimum of a systematic error function. One embodiment for generating the global minimum uses a Continuous Greedy Randomized Adaptive Search Procedure.

4 Claims, 17 Drawing Sheets

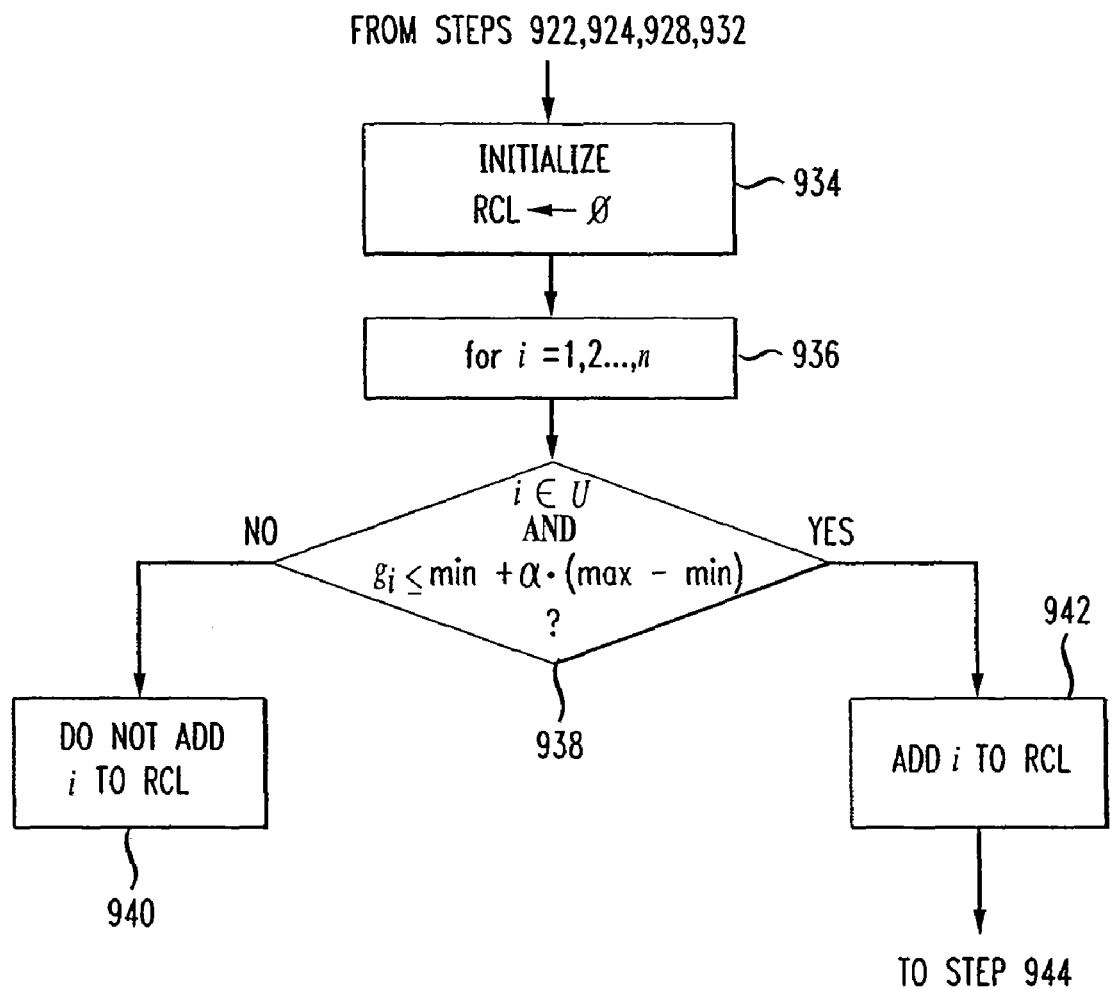

SENSOR REGISTRATION BY GLOBAL OPTIMIZATION PROCEDURES

CROSS-REFERENCE TO RELATED APPLICATION

This application is a continuation of prior application Ser. No. 11/821,041, filed on Jun. 20, 2007, and issued as U.S. Pat. No. 7,653,513, on Jan. 26, 2010, which is herein incorporated by reference in its entirety.

BACKGROUND OF THE INVENTION

The present invention relates generally to methods for sensor registration, and more particularly to sensor registration via global optimization methods.

For measuring parameters in a system, multiple sensors may be deployed. For example, the temperature in a building complex may be monitored by installing thermometers throughout the complex. If the thermometers are read at different times, the temperature within the complex may be mapped as a function of location and time. In this example, three types of sensors are involved: a position sensor, a thermal sensor, and a time sensor. Depending on the system requirements, sensors may have a wide range of complexity. For example, a position sensor may be as simple as a tape measure, or as complex as a laser interferometer. Similarly, a thermal sensor may be as simple as a household thermometer, or as complex as an infrared imaging system.

For a measurement system comprising multiple sensors, a key process is sensor registration, which may be broadly construed as applying correction factors to sets of data measured by more than one sensor. Details of sensor registration are discussed below. One simple example of sensor registration is the synchronization of two clocks. At the same instant, if one clock reads 2:00 pm, and a second clock reads 2:05 pm, there is a 5 minute offset between the two. If the clocks are adjustable, they may be registered by adjusting them until they read the same; that is, the offset is set to zero. Alternatively, the offset may be corrected when the data is processed. If the first clock is used as a reference, 5 minutes are subtracted from the time read by the second clock. A second example of sensor registration is the calibration of two thermometers. At the same temperature, if one thermometer reads 110 degrees C. and a second thermometer reads 113 degrees C., there is a 3 degree offset between the two. If the thermometers have a calibration adjustment, the offset may be set to zero. Alternatively, in processing of the temperature data, if the first thermometer is used as a reference, 3 degrees may be subtracted from the reading of the second thermometer.

Some sensors measure a localized value. For example, a thermometer reads the temperature at the location of the thermometer. Other sensors sample values over a region. For example, an infrared camera measures temperatures over a region within its field of view. With a measurement system comprising a distributed array of infrared cameras, the temperature over an extended region may be mapped. Furthermore, more detailed characterization of the temperature variation over a localized region may be acquired if the field of view of multiple infrared cameras overlap. The temperature may be averaged over the readings from multiple cameras, for example. The process of aggregating data from multiple sensors is referred to as data fusion. Proper data fusion requires sensor registration. In the example of infrared cameras, temperature offsets among the different cameras need to be determined. Also, the relationship between the coordinates of a point measured relative to a specific infrared camera and the coordinates of the same point measured relative to a common reference coordinate system need to be determined. Furthermore, if the temperatures are measured as a function of time, and if times are read from a time stamp relative to an internal clock in each infrared camera, synchronization of the clocks to a common reference is required.

The number of sensors which a measurement system can accommodate is limited in part by the mode of data collection. For example, if temperature is measured by thermometers installed throughout a complex, the number of sensors may be limited by the number of stations that a technician can visit within a fixed period of time. With sensors which can transmit data remotely, however, complex measurement systems comprising large arrays of sensors connected via a network may be constructed. The size of the sensor array depends in part on the number of sensors measuring the same parameter at different locations (e.g., 100 infrared imaging systems placed at different locations) and in part on the number of sensors measuring different parameters at the same location (e.g., sensors to measure position, time, temperature, air pressure, and humidity). Therefore, a coherent method for registering an array of sensors, in which the array comprises an arbitrary number of sensors of arbitrary types, is advantageous. For dynamic measurement systems, sensor registration in near real time is further advantageous.

In many applications, measurements from multiple objects need to be collected. In one of the examples above, the temperature distribution of a building complex is monitored by placing thermometers throughout the complex. Here the temperatures at multiple locations are collected from multiple thermometers. In this instance, the thermometers are installed in fixed locations. For example, thermometer 1 is installed in room 101 on the first floor, and thermometer 2 is installed in room 201 on the second floor. The identities of the thermometers are well-known, and the probability of mis-identifying a thermometer is small. The probability is not zero, however, since a technician may make an error. For example, "thermometer 2, room 301" is erroneously entered into a database.

In other situations, identification of the objects may not be straightforward. This is especially true if the objects are mobile. Consider the tracking of aircraft by radar systems. For a commercial airliner, the pilot is in contact with air traffic controllers. The airliner broadcasts a unique identification number, and the identity of the plane is maintained as it is passed from one control tower to another. In a military situation, however, the identities of all the planes will probably not be known, especially for enemy aircraft. Distinguishing friendly aircraft from hostile aircraft is, of course, crucial.

In a complex measurement system, then, multiple sets of data are collected from multiple objects by multiple sensors. For correct characterization of the objects, the identification of the objects being measured by more than one sensor must be determined. For a single object being measured by more than one sensor, sensor registration errors need to be corrected. One approach to sensor registration between two sensors involves minimizing a likelihood function associating the measurements of the objects by two sensors. With this approach, sensor registration falls into the category of global optimization problems, which arise in a variety of science and engineering fields, as well as in other fields such as economics.

Existing methods for solving global optimization problems have various limitations, such as, requiring a good initial estimate of the optima or advance knowledge of the gradient of the function to be optimized. Also, some methods may converge on local minima instead of the global minimum. A coherent method for solving global optimization problems which do not have the above limitations are advantageous. Methods which are computationally efficient are further advantageous.

BRIEF SUMMARY OF THE INVENTION

A method for registering a first sensor sensing a first set of measurements from a first plurality of objects and a second sensor sensing a second set of measurements from a second plurality of objects is performed by a two-step process wherein a systematic error function is first separated from an assignment function. The systematic error function is based at least in part on a likelihood function associating a data element from the first set of measurements with a data element from the second set of measurements. The minimum of the systematic error function is generated to determine a correction factor for the systematic error. An assignment method is then used to assign an object from the first plurality of objects to an object from the second plurality of objects, based at least in part on the minimized systematic error function. Decomposing the problem into a systematic error problem followed by an assignment problem leads to a less complex, more computationally efficient method for sensor registration.

In one embodiment, the systematic error function is minimized by applying a global minimization technique. An advantageous global minimization technique is Continuous Greedy Randomized Adaptive Search Procedure, which is computationally efficient and has a high probability of finding the global minimum, or at least a good estimate of the global minimum, in a wide variety of applications.

These and other advantages of the invention will be apparent to those of ordinary skill in the art by reference to the following detailed description and the accompanying drawings.

BRIEF DESCRIPTION OF THE DRAWINGS

FIGS. 9A-9C are flowcharts of a second embodiment of a construction phase;

DETAILED DESCRIPTION

Figure 1:
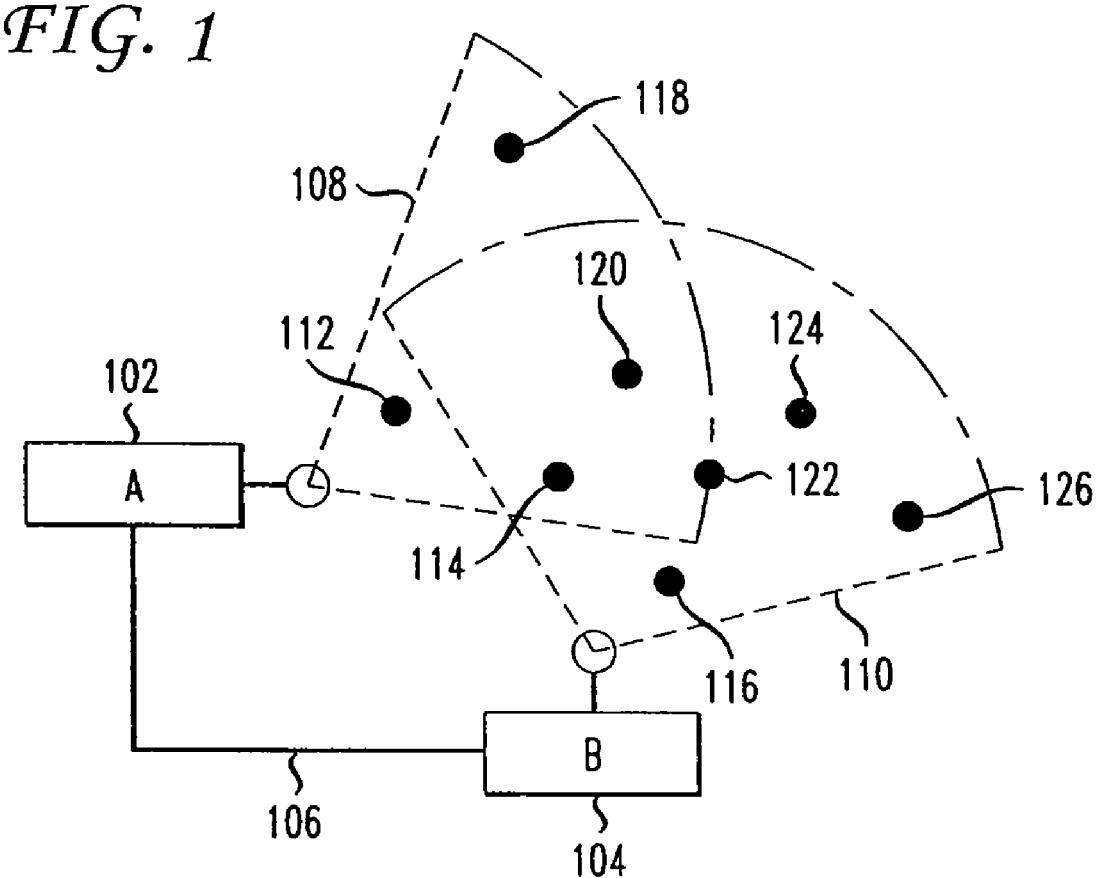
FIG. 1 is a schematic of a radar system comprising two sensors.

Sensor registration is a process applicable to any generic data measurement system comprising two or more sensors which collect sets of measurements from one or more objects. Herein, an "object" refers to an entity with characteristics that may be measured. Examples of objects include a car, an air mass, and a light beam. In the examples above, characteristics include the speed of a car, the temperature of an air mass, and the wavelength of a light beam. Objects may also include non-physical entities. In an economics application, for example, an object may include a business, and characteristics may include profit, number of employees, and cost of goods sold.

Herein, a "sensor" refers to an entity that may measure characteristics of an object. In the examples above, sensors include a speedometer for measuring the speed of a car, a thermometer for measuring the temperature of an air mass, and a spectrometer for measuring the wavelength of a light beam. Sensors are not restricted to physical instruments. A person may be a sensor (for example, counting chairs, observing colors, and feeling surface texture). Herein, a "database" collecting data may also be a "sensor."

Herein, a set of measurements comprises "data elements". Data elements may be measured from more than one object. For example, each temperature in a combined set of temperature measurements from five objects is a "data element". Data elements comprise both measured values and mathematical functions of measured values. For example, if the temperatures of five objects are measured, the average of the five temperatures is also a data element. As another example, if angle is measured, the sine of the angle is also a data element.

For a single object whose characteristics are being measured by two or more sensors, differences in the measurements from different sensors may result from differences in the characteristics of the sensors themselves. Herein, "registration error" refers to the difference in the measurements of the same characteristic of the same object by multiple sensors, wherein the difference is a function of the characteristics of the sensors. Registration errors between sensors fall into two classes: random and systematic. Random registration errors are inherent in measurement systems and generally cannot be corrected. In a system measuring positions of objects, for example, the position sensors may be sensitive to temperature variations. If the temperature fluctuates, random registration errors may be generated. Similarly, in a system measuring temperatures at different locations, random registration errors may be generated if the temperature sensors are subjected to shock and vibration.

Systematic errors, on the other hand, are stable (or at least quasi-stable). In a system measuring the positions of objects, for example, the coordinates of a common fixed reference point may be offset in the different sensors. Similarly, in a system measuring temperatures, there may be a calibration error between the temperature sensors. Systematic errors are capable of being corrected.

If measurements from multiple objects are being collected by multiple sensors, the identities of the objects being measured must be determined. Herein, "object being measured" refers to an object whose characteristics are being measured by a sensor. Herein, "assignment" refers to specifying the correspondence between an object being measured by one sensor and an object being measured by another sensor. For example, if sensor A measures the temperatures of three objects, designated object A1, object A2, and object A3, and if sensor B measures the temperatures of two objects, designated object B1 and object B2, then, assignment of object A1 to object B2 means that object A1 and object B2 are the same object being measured by the two sensors.

Herein, "sensor registration" refers to a process wherein multiple objects being measured by multiple sensors are assigned and wherein systematic errors between the multiple sensors are corrected. If assignment of the objects is known, sensor registration may be performed by routine techniques such as least-squares estimation or Kalman filtering. If assignment of the objects is not known, sensor registration is more complex. A computationally efficient method for sensor registration wherein the assignment of objects is not known is advantageous.

An example of sensor registration is discussed here with respect to a radar system, shown schematically in FIG. 1. The system comprises two sensors, sensor A 102 and sensor B 104, connected by communication link 106. The sensors detect microwaves backscattered from targets 112-126. The field of view of sensor A 102 is indicated by sector 108, delineated by the dotted lines. The field of view of sensor B 104 is indicated by sector 110, delineated by the dashed lines.

Figure 2A:
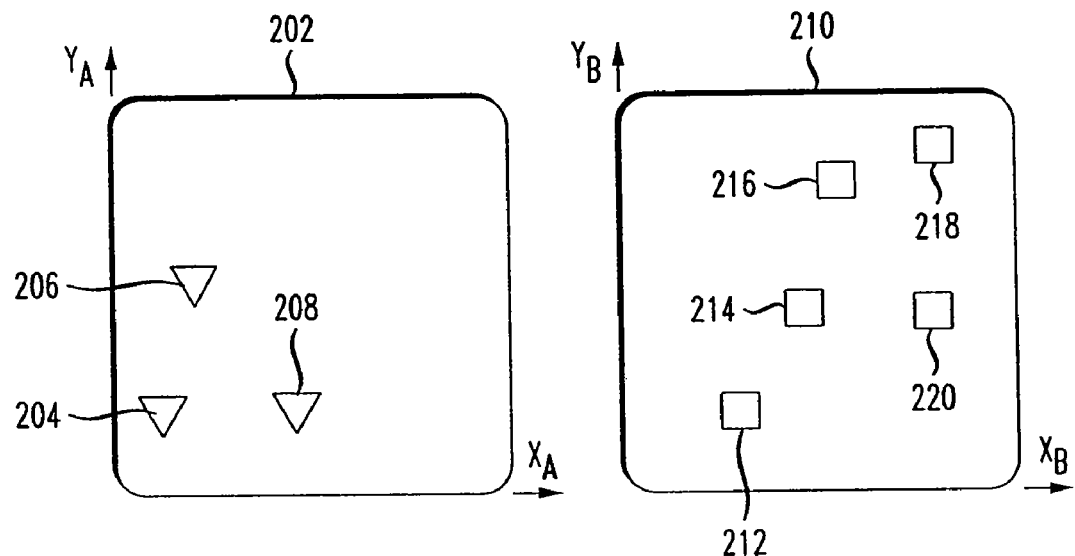
FIG. 2A is a graphical representation of targets on two separate displays.
Figure 2B:
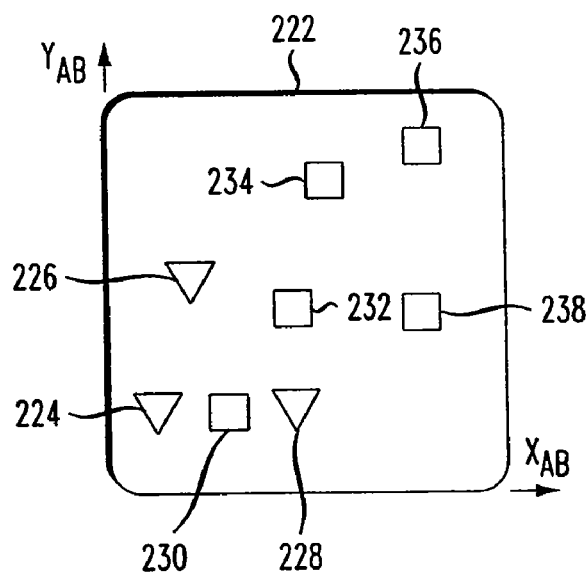
FIG. 2B is a graphical representation of targets on a combined display.

FIG. 2A shows displays of targets detected by the sensors. Display 202 shows the positions, at a specific time, of three targets 204-208 (indicated as triangles) detected by sensor A 102. The lateral positions of the targets are referenced to the local coordinate system of sensor A 102, $X_A$-$Y_A$. Similarly, display 210 shows the positions, at the same specific time as above, of five targets 212-220 (indicated as squares) detected by sensor B 104. The lateral positions of the targets are referenced to the local coordinate system of sensor B 104, $X_B$-$Y_B$. In FIG. 2B, display 222 is an aggregate display of all the targets detected by sensor A 102 and sensor B 104. The lateral positions of the targets are referenced to a common coordinate system, $X_{AB}$-$Y_{AB}$. Targets 224-228 in display 222 correspond to targets 204-208 in display 202. Targets 230-238 in display 222 correspond to targets 212-220 in display 210. The common coordinate system $X_{AB}$-$Y_{AB}$ may comprise coordinate system $X_A$-$Y_A$, coordinate system $X_B$-$Y_B$, or an independent one.

In this example, both the assignment of objects and the systematic error are unknown. A process is therefore required to determine which target detected by sensor B 104 is the same (if any) as a target detected by sensor A 102. In this example, systematic error arises from mapping between coordinate systems $X_A$-$Y_A$ and $X_B$-$Y_B$. For example, the zero reference point, scale, and orientation of the two coordinate systems may be different. There are several approaches for solving these two unknowns. In one approach, solution of both unknowns are simultaneously attempted. In a second approach, the systematic error is first corrected without regard to assignment, and then proper assignment is established. This second approach may appear to be counter-intuitive, but an embodiment, discussed below, shows that it is advantageous.

An embodiment for performing sensor registration uses global optimization analysis. A generalized version of the example given above for a radar system is used to illustrate an embodiment. The number of targets detected by sensor A 102 is $N_A$, and the number of targets detected by sensor B 104 is $N_B$. The sensors detect the track of each target. Herein, "track" is a state function comprising characteristic parameters of the target. In this example, as discussed below, the track comprises position coordinates (X-Y-Z) and their covariances. The objective in this instance is to determine correct assignment of the targets and to correct systematic errors. In this example, determining correct "assignment of targets" refers to correctly determining which target measured by sensor A 102 is the same target (if any) measured by sensor B 104. The coordinate system of sensor A 102 is used as the reference coordinate system. Therefore, systematic errors are attributed to sensor B 104.

Variables $P_A(i)$ and $C_A(i)$ denote the position and covariance estimates of the i-th track detected by sensor A 102. Similarly, $P_B(j)$ and $C_B(j)$ denote the position and covariance estimates of the j-th track detected by sensor B C04. Covariance here refers to covariance of the variables in the track (for example, covariance of the X-Y-Z values). There is a one-to-one correspondence between a target and its track. Therefore i ranges from 1 to $N_A$, and j ranges from 1 to $N_B$. The method discussed here is illustrated for two sensors, but may apply to more than two. For example, one sensor may be chosen as a reference sensor, and each of the other sensors may then be registered to the reference sensor.

A function $\Omega$ denotes a function which characterizes the systematic error arising from data measured by sensor B 104. That is, $\Omega(P_B(j))$ and $\Omega(C_B(j))$ would remove the systematic error from the j-th track of sensor B 104. Then, the likelihood function which associates the i-th track of sensor A 102 with the j-th track of sensor B 104 can be written as a function of $\Omega$:

$$F_{ij}(\Omega) = \frac{1}{\sqrt{(2\pi)^m |S_{ij}|}} e^{-\frac{1}{2} t_{ij}^T S_{ij}^{-1} t_{ij}} \qquad \text{(Eqn. 1)}$$

for $i=1, \ldots, N_A$ and $j=1, \ldots, N_B$,
where $$t_{ij} = P_A(i) - \Omega(P_B(j)) \qquad \text{(Eqn. 2)}$$

$$S_{ij} = C_A(i) + \Omega(C_B(j)) \qquad \text{(Eqn. 3)}$$

and
m=dimension of the track vector. (For example, m=3 if the track comprises the position elements X, Y, Z.)
In the above notation, $t^T$ denotes the transpose, $S^{-1}$ denotes the inverse, and |S| denotes the determinant.

If the i-th track of sensor A 102 corresponds to the same target as the j-th track of sensor B 104, then the systematic error is a function of $-F_{ij}(\Omega)$. That is, as the likelihood of association between these two tracks increases, the systematic error decreases. In this instance, one objective of sensor registration is to minimize $-F_{ij}(\Omega)$.

In the case in which assignment of objects is unknown, correct assignment of targets must be determined. Assignment may be characterized by the assignment variable $\psi_{ij}$, where $\psi_{ij}=1$ if the i-th track of sensor A 102 corresponds to the same target as the j-th track of sensor B 104, and $\psi_{ij}=0$ otherwise. The objective of determining the correct assignment of targets and minimizing the systematic error may be formulated as:
finding the function $\Omega$ which minimizes the function $F(\Omega)$, where $$F(\Omega) = -\sum_{i=1}^{N_A} \sum_{j=1}^{N_B} \psi_{ij} F_{ij}(\Omega) \qquad \text{(Eqn. 4)}$$

subject to the constraints $$\sum_{i=1}^{N_A} \psi_{ij} \leq 1, \text{ for all } j, \quad \text{(Eqn. 5)}$$

$$j = 1, \ldots, N_A$$

and $$\sum_{j=1}^{N_B} \psi_{ij} \leq 1, \text{ for all } i, \quad \text{(Eqn. 6)}$$

$$i = 1, \ldots, N_A$$

where $$\psi_{ij} = 0 \text{ or } 1, \text{ for all } i, i=1,\ldots,N_A \text{ and for all } j, j=1,\ldots,N_B. \quad \text{(Eqn. 7)}$$

Herein, $F(\Omega)$ is referred to as a "sensor registration function." The constraints in Eqns. 5-7 allow two situations. In the first, a target detected by sensor A 102 does not correspond to any target detected by sensor B 104. In the second, a target detected by sensor A 102 has a one-to-one correspondence to a target detected by sensor B 104.

Eqns. 4-7 constitute a mixed-integer non-linear programming problem, in which $\psi_{ij}$ are the binary variables, and the continuous variables are encapsulated in the $\Omega$ function. In one embodiment, a method for solving Eqns. 4-7 comprises decomposing the problem into two steps. The first step is to determine the "best" $\Omega$, irrespective of the assignment variables. The first step may be formulated as:

finding the function $\Omega$ which minimizes the function $\hat{F}(\Omega)$, where $$\hat{F}(\Omega) = -\sum_{i=1}^{N_A} \sum_{j=1}^{N_B} F_{ij}(\Omega) \quad \text{(Eqn. 8)}$$

Herein, $\hat{F}(\Omega)$ is referred to as a "systematic error function." Finding the "best" $\Omega$ requires finding the global minimum of the systematic error function $\hat{F}(\Omega)$ as a function of $\Omega$. The solution yields a correction factor which corrects the systematic errors.

Once the best $\Omega$ has been determined, a linear assignment method may then be used to determine the assignment variables between the data from sensor A 102 and the data, corrected for systematic errors, from sensor B 104.

Existing algorithms attempt to solve Eqns. 4-7 in one step: that is, simultaneously determine assignment of targets and correct systematic errors. Some existing methods are complex and may involve embedding a non-linear programming algorithm in a branch and bound scheme. In the worst case, the algorithms are equivalent to enumerating all of the assignments, and, for each assignment, solving a non-convex, non-linear optimization problem. Some existing algorithms require a good initial first estimate of the systematic error. If the initial estimate is insufficient, they may converge on the wrong solution. Some existing algorithms suffer from a guaranteed exponential worse-case bound on the number of assignments considered. They are computationally inefficient.

The method used in an embodiment solves Eqns. 4-7 by decomposing the problem into a two-step problem. The first step is solving a non-linear problem. The second step involves solving a linear assignment problem. Existing methods for solving linear assignment problems are well characterized and computationally efficient. The decomposition method used in an embodiment has a number of advantages over prior art methods. These advantages include, but are not limited to, the following: it is computationally efficient; it does not require an initial good estimate; and it does not suffer from a guaranteed exponential worse-case bound on the number of assignments.

Figure 2C:
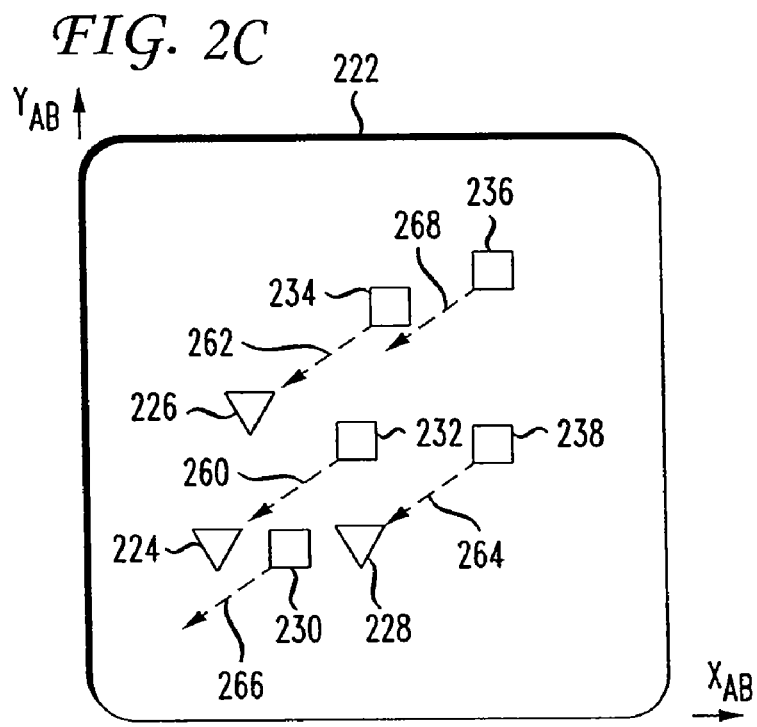
FIG. 2C is a graphical representation of a translation offset between two coordinate systems.
Figure 2D:
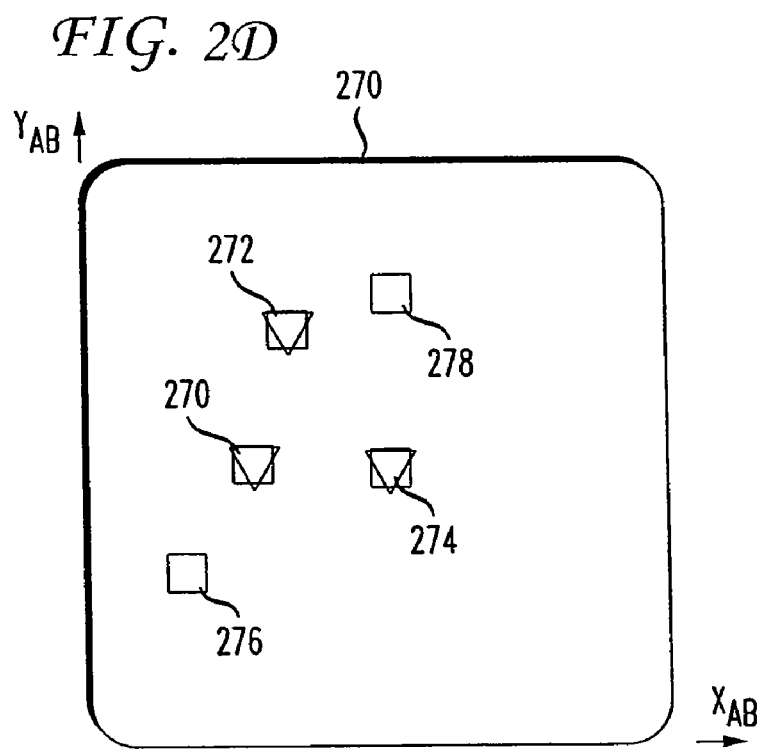
FIG. 2D is a graphical representation of targets after correct assignment and sensor registration.

FIGS. 2C and 2D provide examples for determining correct target assignment and minimizing systematic errors for the instance shown in FIG. 2B. In the first step, shown in FIG. 2C, the solution to Eqn. 8, yields the result that the coordinates of a position measured by sensor B 104 are offset by a constant translation vector from the coordinates of a position measured by sensor A 102. Using the coordinate system of sensor A 102 as the reference, the coordinates of positions measured by sensor B 104 may be corrected by applying the constant translation vectors indicated by the dashed lines 260-268. In the second step, the solution to Eqns. 4-7 yields correct assignment of the targets common to both sensor A 102 and sensor B 104. In FIG. 2C, target 224 is identified to be the same as target 232. Similarly, target 226 is identical to target 234, and target 228 is identical to target 238. Targets 230 and 236 are detected by sensor B 104, but not by sensor A 102. FIG. 2D shows a schematic of the target configuration after correct assignment and correction of the systematic error. There are five unique targets at the positions indicated after the translation of the coordinate system of sensor B 104 to the coordinate system of sensor A 102. The two targets previously identified as 204 in display 202 and 214 in display 210 are now mapped into a single target 270 in display 270. Similarly, the pair of targets 206 and 216 are mapped into a single target 272, and the pair of targets 208 and 220 are mapped into a single target 274. Data fusion for the set of measurements associated with the targets may now be properly processed.

Finding the solution to Eqn. 8 falls into a class of mathematical problems referred to as global optimization problems. Optimization comprises both maximization and minimization. Since a maximization problem, however, can always be recast as a minimization problem, hereinafter, the phrase "global minimization problem" will be used to comprise both global minimization and global maximization problems.

Figure 3:
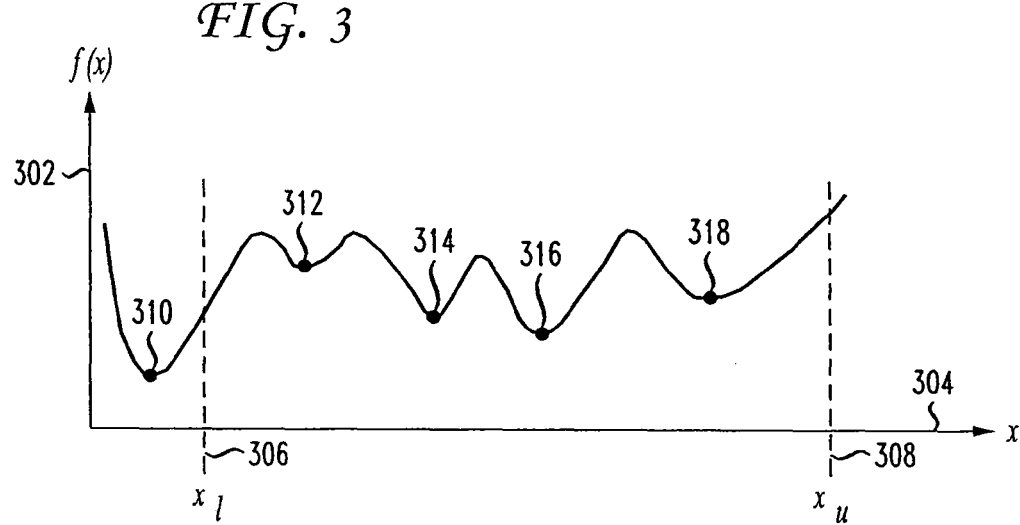
FIG. 3 is graph of a function with multiple local minima and a single global minimum.

A simple illustrative example of a global minimization problem is shown in the graph in FIG. 3. The horizontal axis 304 represents the value of a one-dimensional variable x. The vertical axis 302 represents the value of a function $f(x)$. The problem is to find the minimum value of $f(x)$ over the range $x_l \leq x \leq x_u$, where $x_l$ is the lower bound 306 and $x_u$ is the upper bound 308. One approach is to first solve for local minima, indicated by points 312-318. The minimum value of the set of local minima is point 316, which is therefore the global minimum. Note that point 310 has a smaller value of $f(x)$ than point 316. Since point 310 lies outside of the range $x_l \leq x \leq x_u$, however, it is discounted.

In some global minimization problems, the global minimum may be determined analytically. In general, however, numerical computation techniques are used. These techniques do not necessarily generate a "true" global minimum, because, in some problems, the existence of a global minimum may not be able to be established. Even if a global minimum does exist, the global minimum generated by a numerical computation technique cannot be analytically proven to be the "true" global minimum. In general, the result of the numerical computation is an "estimate" of the global minimum. To simplify the terminology, herein, the term "global minimum" comprises the true global minimum for problems in which a global minimum may be analytically established and calculated, and an estimate of the global minimum otherwise. A numerical computation method for generating a global minimum is successful if it generates a close approximation of the true global minimum in problems in which a global minimum may be calculated analytically. In general, a numerical computation method for generating a global minimum is successful if it generates empirically successful solutions in a high percentage of applications. Techniques which are computationally efficient are advantageous.

An embodiment uses a numerical computation method for solving global minimization problems. It is referred to herein as "Continuous Greedy Randomized Adaptive Search Procedure (C-GRASP)". In one embodiment, C-GRASP is a metaheuristic for solving continuous global minimization problems subject to box constraints. Generalizing the example shown in FIG. 3 above, x is an n-dimensional vector whose components comprise continuous real numbers. For example, if x is a vector indicating the X-Y-Z coordinates of an object, $x=x(X,Y,Z)$, then x is a three-dimensional vector. Similarly, if x is a vector indicating both the coordinates of an object and its velocity, $x=x(X,Y,Z,V_X,V_Y,V_Z)$, where $V_X, V_Y, V_Z$ are the velocity components, then x is a six-dimensional vector. In formal mathematical terms, one embodiment of C-GRASP operates over the domain S defined by $$S=\{x=(x_1,\ldots x_n) \in \Re^n : l \leq x \leq u\}, \quad \text{(Eqn. 9)}$$

where x, l, and u are n-dimensional vectors which are members of the n-dimensional space of real numbers $\Re^n$. The domain is bounded over the region $l \leq x \leq u$, such that $u_i \geq l_i$ for $i=1, \ldots, n$.

For a function $f(x)$ in n-dimensional space which is mapped into one-dimensional space, $f(x): \Re^n \to \Re$, the global minimization problem is to find the value of $x^*$ which yields the minimum value of $f(x)$ within the region bounded by $l \leq x \leq u$. That is, $$x^* = \arg\min\{f(x) | l \leq x \leq u\}. \quad \text{(Eqn. 10)}$$

One skilled in the art may apply embodiments of C-GRASP to other instances. For example, C-GRASP may operate in a space of complex numbers by mapping the real and imaginary components of a complex number to two real numbers. Other embodiments may apply to domains which are not subject to box constraints.

Figure 4:
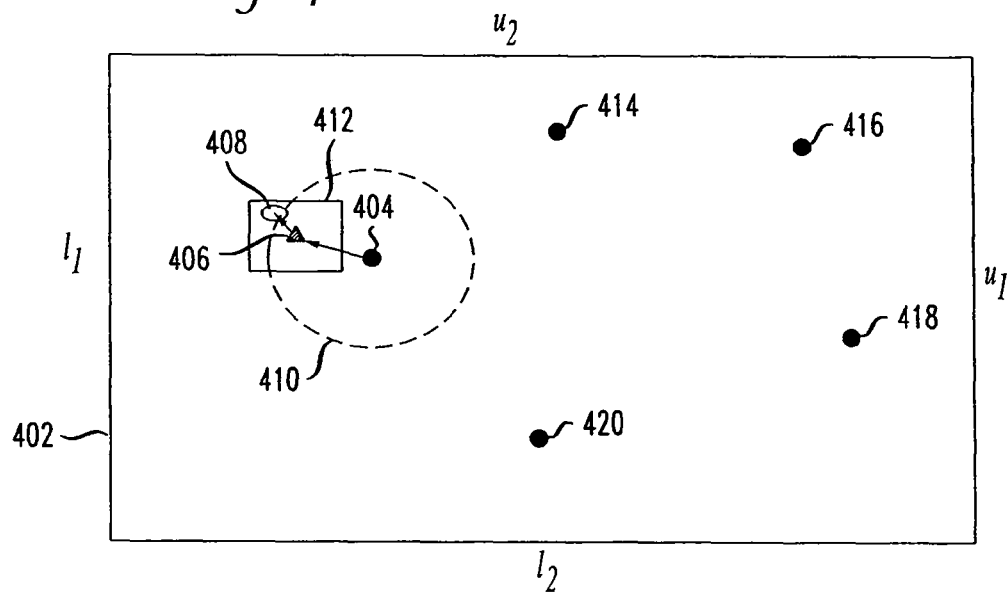
FIG. 4 is a graphical representation of the basic principles of C-GRASP.

FIG. 4 is a schematic used to illustrate some underlying principles of C-GRASP. Further details of embodiments are given below. Embodiments of C-GRASP comprise three phases. They are referred to herein as "construction phase," "local-improvement phase," and "total phase." The rectangular region 402, delimited by lower bound $l=(l_1, l_2)$ and upper bound $u=(u_1, u_2)$, represents S, the domain of x over which the global minimum of $f(x)$ is sought. An initial point $x_0$ 404, indicated by a solid circle, is chosen at random. A local minimum in a region around the initial point $x_0$ 404 is generated by a two-step process comprising a construction phase followed by a local-improvement phase. In the construction phase, an initial greedy randomized solution is constructed in a region 410 around the initial point $x_0$ 404. Note that 410 is represented by the region within the dashed circle. This is for illustration only, and does not necessarily represent a region used in an embodiment. Greediness refers to a process seeking a local minimum, not necessarily a global minimum. Randomization is introduced into both the construction phase and local-improvement phase to increase the probability of finding a local minimum. The greedy randomized solution $x_1$ 406, indicated by a triangle, is a starting "good" solution.

After the construction phase, a local-improvement phase attempts to find a "locally-improved" solution by conducting a search in the local neighborhood 412 around the greedy randomized solution $x_1$ 406. A solution is improved if the new value of $f(x)$ is less than the previous value of $f(x)$. Note that 412 is represented by the region within the square. This is for illustration only, and does not necessarily represent a region used in an embodiment. The locally-improved solution is represented by $x_2$ 408, indicated by an ellipse. Improvement results if $f(x_2)<f(x_1)$. The point $x_2$ 408 is then used as the initial point for a second series of construction and local-improvement phases. This series is iterated a user-defined number of times to yield the local minimum in a region around the initial point $x_0$ 404. In the total phase, the entire sequence of construction phase followed by local-improvement phase is then repeated for an array of initial randomly chosen points, such as 414-420, within domain S 402. At each point, the result is a local minimum in a region around the point. The minimum of the set of local minima is then the global minimum within the domain.

Figure 5A:
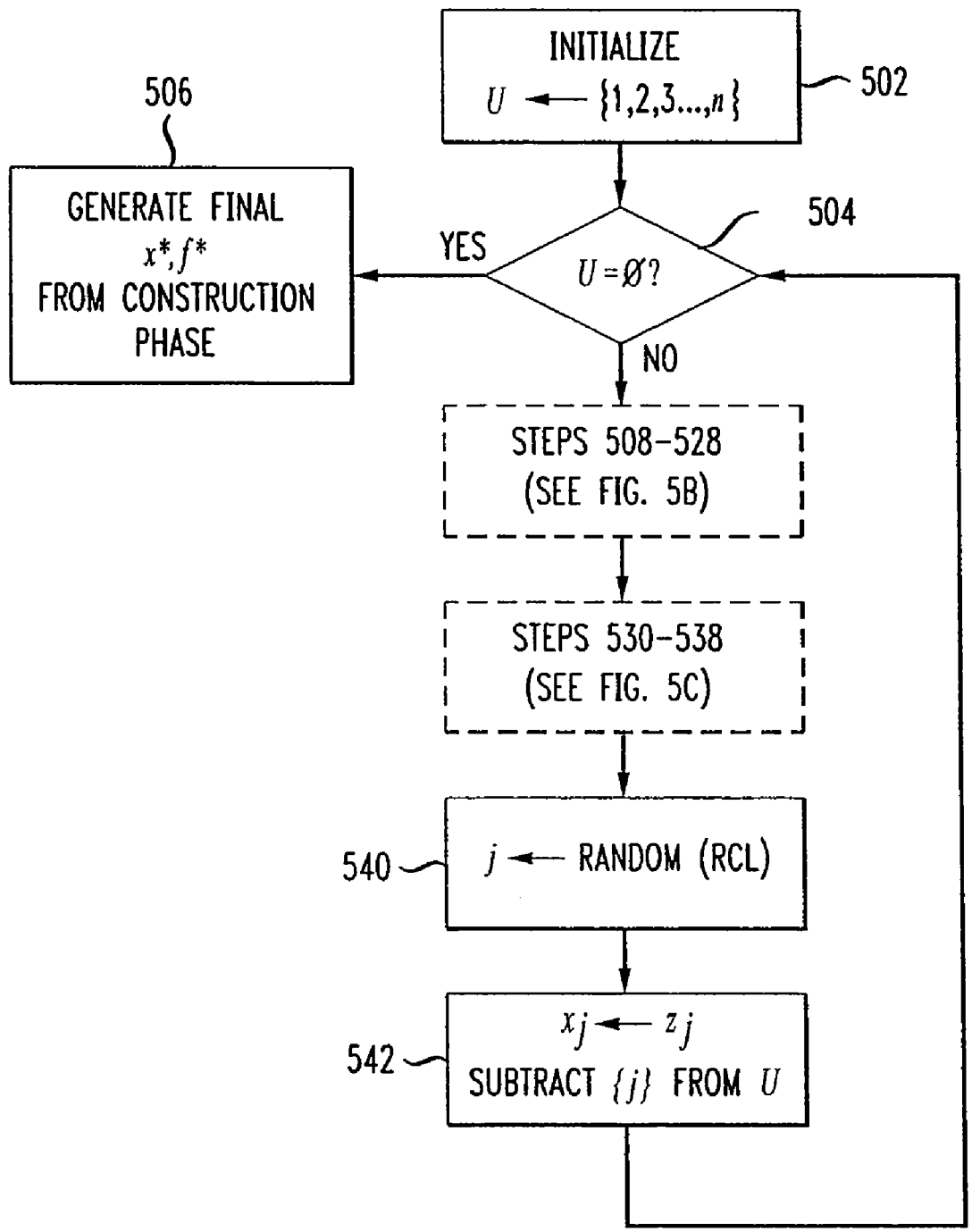
FIG. 5A-5C are flowcharts of a first embodiment of a construction phase.
Figure 5B:
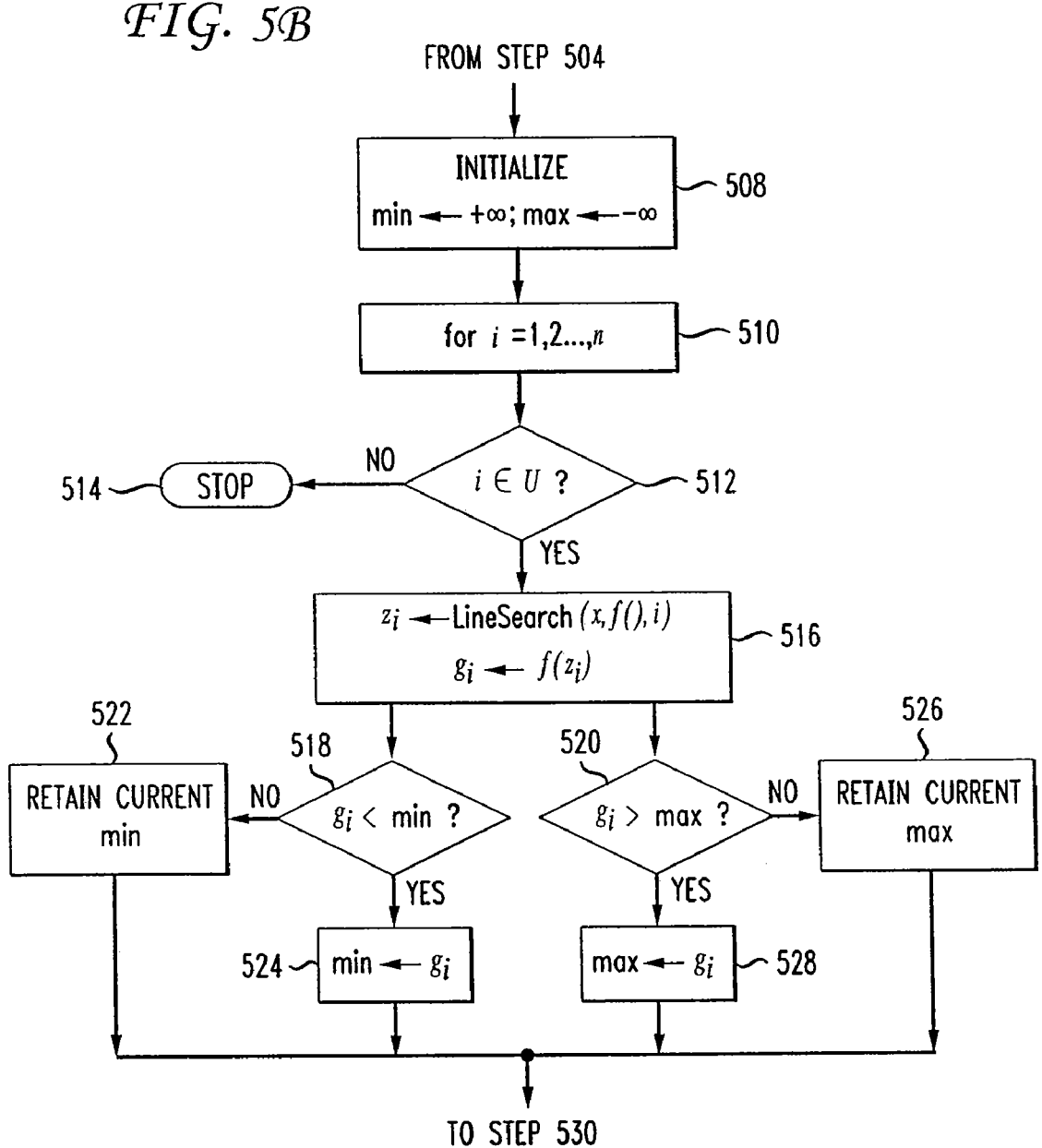
Figure 5C:
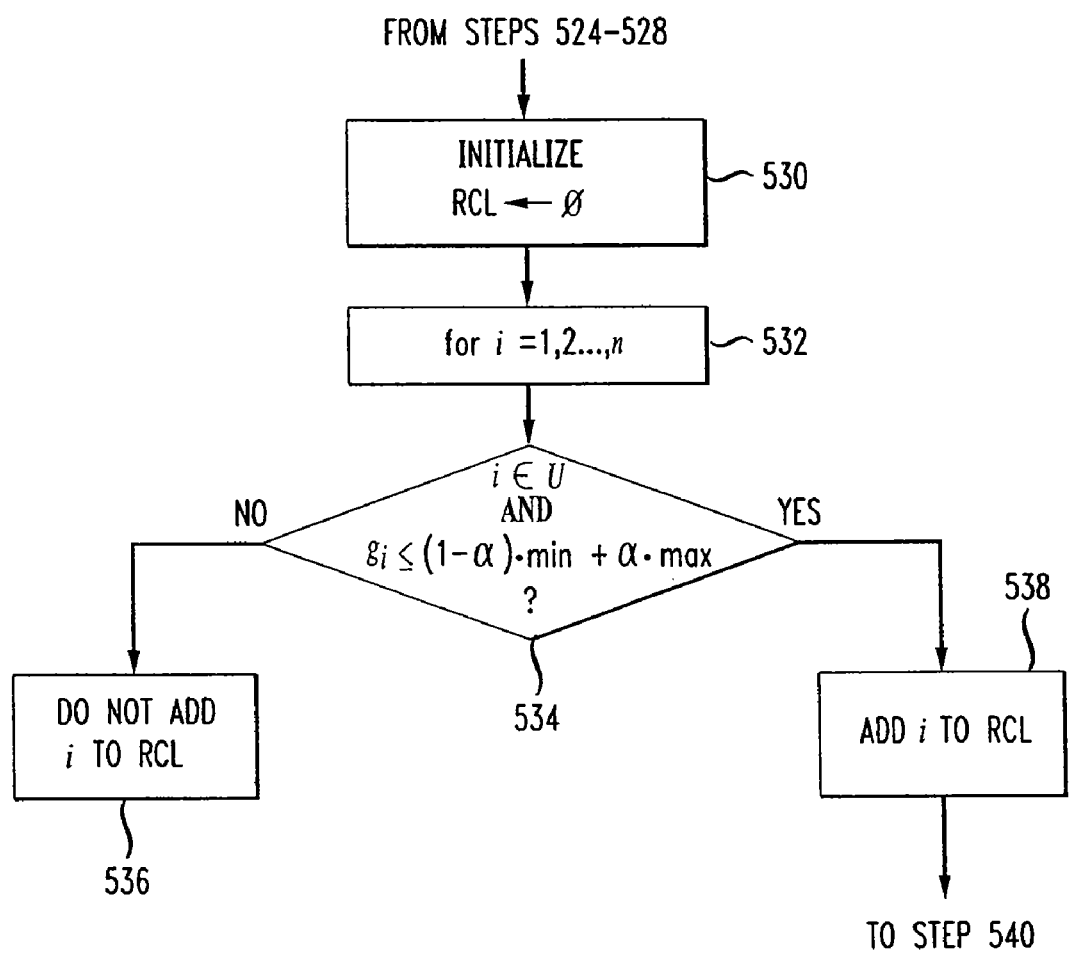

FIGS. 5A-5C show a flowchart of an embodiment of the construction phase, which takes an initial solution x as an input. In step 502, a set of coordinates U is initialized to $U \leftarrow \{1, 2, \ldots, n\}$, where n is the dimension of x. In step 504, U is checked to see whether it is null, $U=\emptyset$. In the first iteration, it is not, and the process continues to step 508, in which the variables min and max are initialized: $\min \leftarrow +\infty$; $\max \leftarrow -\infty$. These variables are defined below. In step 510, steps 512-528 are iterated for $i=1, 2, \ldots, n$. In step 512, i is checked to see whether it is an element of U. In the first iteration, it is, and the process continues to step 516. In subsequent iterations, if it is not, the process stops in step 514 for that value of i. As discussed below, in step 542, an element $\{j\}$ is removed from U after each iteration, and, eventually, $U=\emptyset$.

In step 516, a line search is conducted to determine the minimum value of $f(x)$ as the i-th coordinate of x is varied while the other n-1 coordinates are held fixed. The value of the i-th coordinate which minimizes $f(x)$ is stored as the variable $z_i$. The corresponding value of the function $f(z_i)$ is stored as the variable $g_i$. In step 518, the current minimum value of $g_i$, denoted min, is compared with the current value $g_i$. If $g_i<\min$, then in step 524, min is set to $g_i$; $\min \leftarrow g_i$. If $g_i$ is not less than min, then, in step 522, the current value of min is retained. In step 520, the current maximum value of $g_i$, denoted max, is compared with the current value $g_i$. If $g_i>\max$, then in step 528, max is set to $g_i$; $\max \leftarrow g_i$. If $g_i$ is not greater than max, then, in step 526, the current value of max is retained. Upon completion of all iterations in step 510, min is the best (minimum) value of $g_i$ for all values of i, and max is the worst (maximum) value of $g_i$ for all values of i.

After the line search has been performed for each unfixed coordinate, a restricted candidate list (RCL) is formed that contains the unfixed coordinates i whose corresponding values of $g_i$ meet a user-defined condition. In step 530, RCL is initialized to the null set; $RCL \leftarrow \emptyset$. In step 532, steps 534-538 are iterated for $i=1, 2, \ldots, n$. In step 534, if the following condition is met:

$i \in U$ AND $g_i \leq (1-\alpha) \cdot \min + \alpha \cdot \max$, where α is a user-defined parameter $0 \leq \alpha \leq 1$, then, in step 538, i is added to RCL. If the condition is not met, then, in step 536, the value is not added to RCL.

In step 540, j is chosen at random from RCL; $j \leftarrow$ Random (RCL). In step 542, the value of $x_j$ is set to $z_j$; $x_j \leftarrow z_j$. Choosing a coordinate in this way ensures randomness in the construction phase. The value $\{j\}$ is then removed from U. The process then returns to step 504, and steps 508-542 are repeated until all values of j have been chosen. At this time, $U=\emptyset$, and in step

506, the final value of $x^*=\{z_1, z_2, \ldots, z_n\}$, $f^*=f(x^*)$ from the construction phase is generated. The final values of $x^*$ and $f^*=f(x^*)$ generated from a construction phase is referred to herein as a "greedy randomized solution." The flowchart presented in FIGS. 5A-5C show one embodiment of the construction phase. One skilled in the art may develop other embodiments.

Figure 6:
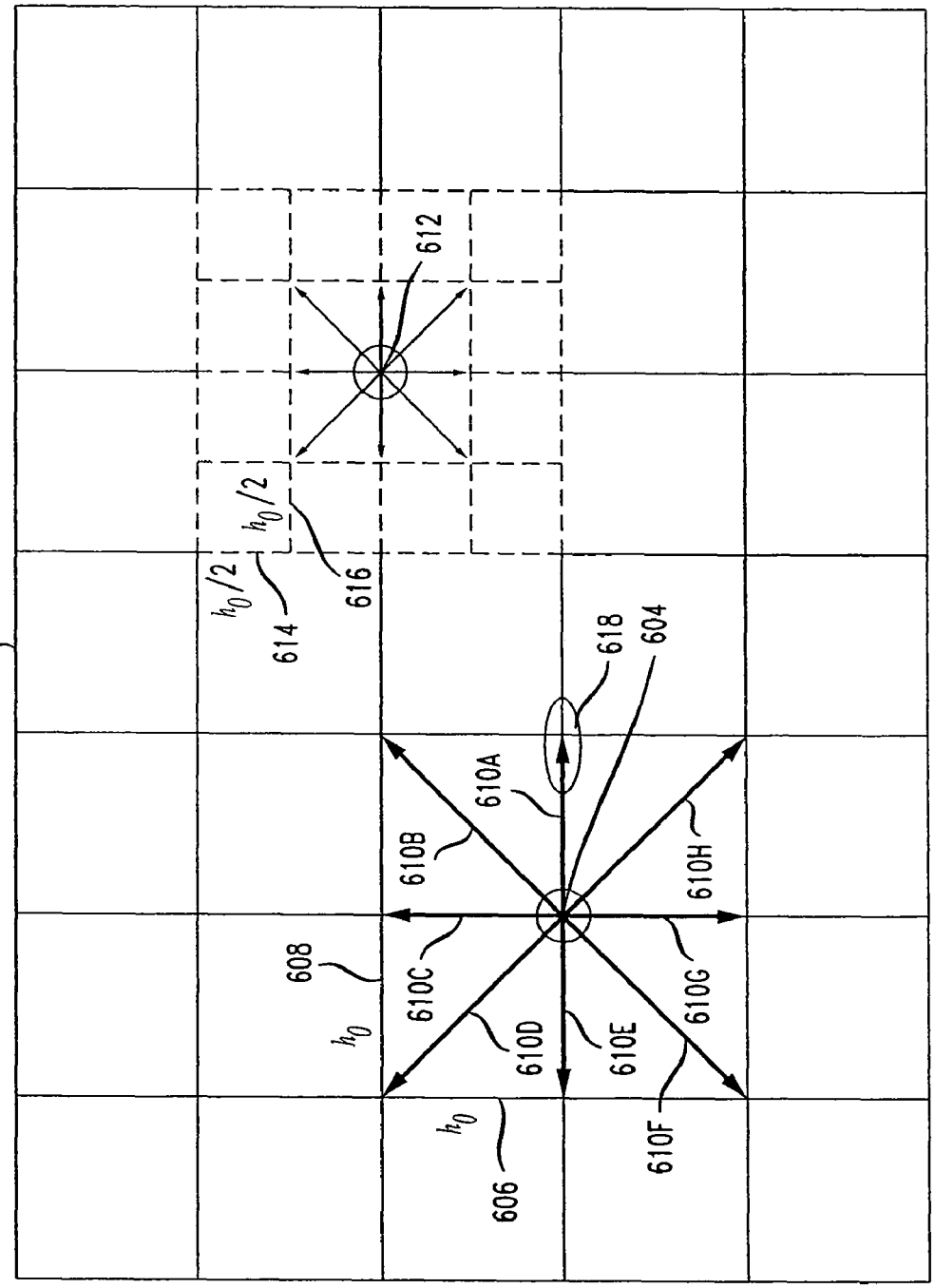
FIG. 6 is a graphical representation of a first embodiment of a local neighborhood search.

This value of x is a "good" value. This value is then processed by a local-improvement phase to yield a locally-improved value. A locally-improved value (if any) is determined by a local neighborhood search around the initial value of x, such that the locally-improved value of $f(x)$ is less than the previous value of $f(x)$. An example of a local neighborhood search is illustrated in FIG. 6 for a two-dimensional domain S, represented by the rectangular region 602. The point 604, indicated by a circle, represents an initial value $x_0$ generated from the construction phase. The local neighborhood around a point is mapped into square grids, whose grid size (length of a side) is denoted h. In the local neighborhood around point 604, the grid size is $h=h_0$. That is, the grid length 608 and the grid height 606 are both $h_0$. During a local neighborhood search, the function is evaluated at a trial value $x=x_1$. This trial value is represented by point 618, indicated by an ellipse. The trial values of $x_1$ which are permissible during a local neighborhood search are a function of permissible directions, represented as the arrows 610A-610H, and the grid size h. In one embodiment, the trial values of $x_1$ are restricted to points at the corners of the square grids in the local neighborhood around the initial point.

The point 612 represents another initial value of x. The grid size in the neighborhood of 612 has a higher density, with a grid size of $h=h_0/2$. That is, the grid length 616 and the grid height 614 are both $h_0/2$. A larger grid size is computationally faster than a small grid size. But a small grid size provides higher resolution and increases the probability of finding an improved value. It is computationally inefficient, however, to start the search with a fine grid size. Instead, as discussed below, an adaptive procedure is used in which a coarse grid is first used to find improved solutions. The grid is then successively reduced when needed to find more improved solutions. Hereinafter, h is referred to as a "discretization parameter." In the example of FIG. 6, the local neighborhood search is based on a square grid, and the density of the grid is increased by dividing the current grid size by 2. One skilled in the art may develop other embodiments of a local neighborhood search. For example, the geometry of the local neighborhood search may be different from a square grid. The discretization parameter may also be reduced by a means other than division by 2.

Figure 7:
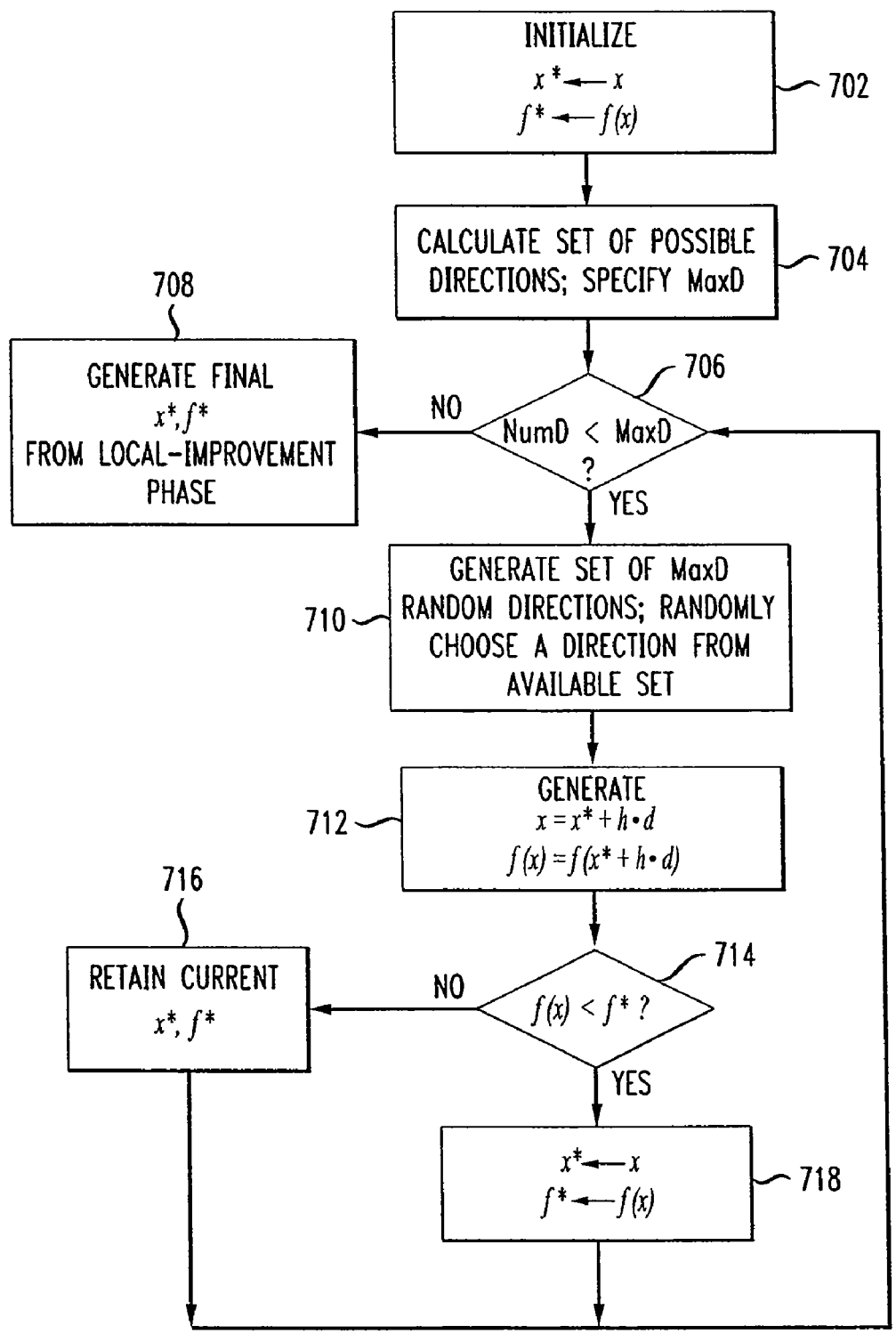
FIG. 7 is a flowchart of a first embodiment of a local-improvement phase.

The steps of the local-improvement phase are shown in the flowchart of FIG. 7. In step 702, the best values $x^*$, $f^*$ are initialized to the current values; $x^* \leftarrow x$ and $f^* \leftarrow f(x)$. Herein, the best value $x^*$ is the value of x for which $f(x^*)=f^*$, where the best value $f^*$ is the current minimum value of $f(x)$. In n-dimensional space, the directions in which a local neighborhood search may be conducted are specified by the direction vectors $d=\{d_1, d_2, d_n\}$, in which the vector components $d_i$ are one of the values $\{-1, 0, 1\}$. Discounting the degenerate case in which the vector components are all equal to 0, there are $3^n-1$ directions in which to search. In the local-improvement phase, searches are conducted in randomly chosen directions.

For large values of n, the number of directions may be too large to process efficiently. A user-defined parameter MaxD specifies the maximum number of directions to try. In step 704, the set of possible directions is calculated, and MaxD is specified. The process then continues to step 706, in which NumD, which tracks the number of local-improvement attempts, is compared with MaxD. The value NumD is initialized to 0, and the process continues to step 710. A set of MaxD direction vectors are randomly generated. From this available set, a direction is randomly selected. A trial solution is then generated in step 712:

$$x=x^*+h \cdot d$$

$$f(x)=f(x^*+h \cdot d).$$

In step 714, the new $f(x)$ is compared with the previous $f^*$. If $f(x)<f^*$, then in step 718, $x^*$ and $f^*$ are set to the new values; $x^* \leftarrow x$ and $f^* \leftarrow (x)$. If $f(x)$ is not less than $f^*$, then, in step 716, the current values of $x^*$, $f^*$ are retained. The process then returns to step 706 for another iteration. When MaxD trials have been completed, then, in step 708, the final best values of $x^*$, $f^*$ are generated from the local-improvement phase. These are the values of the local minimum in a local region around the initial x. The final values of $x^*$ and $f^*=f(x^*)$ generated from a local-improvement phase is referred to herein as a "locally-improved solution."

Figure 8:
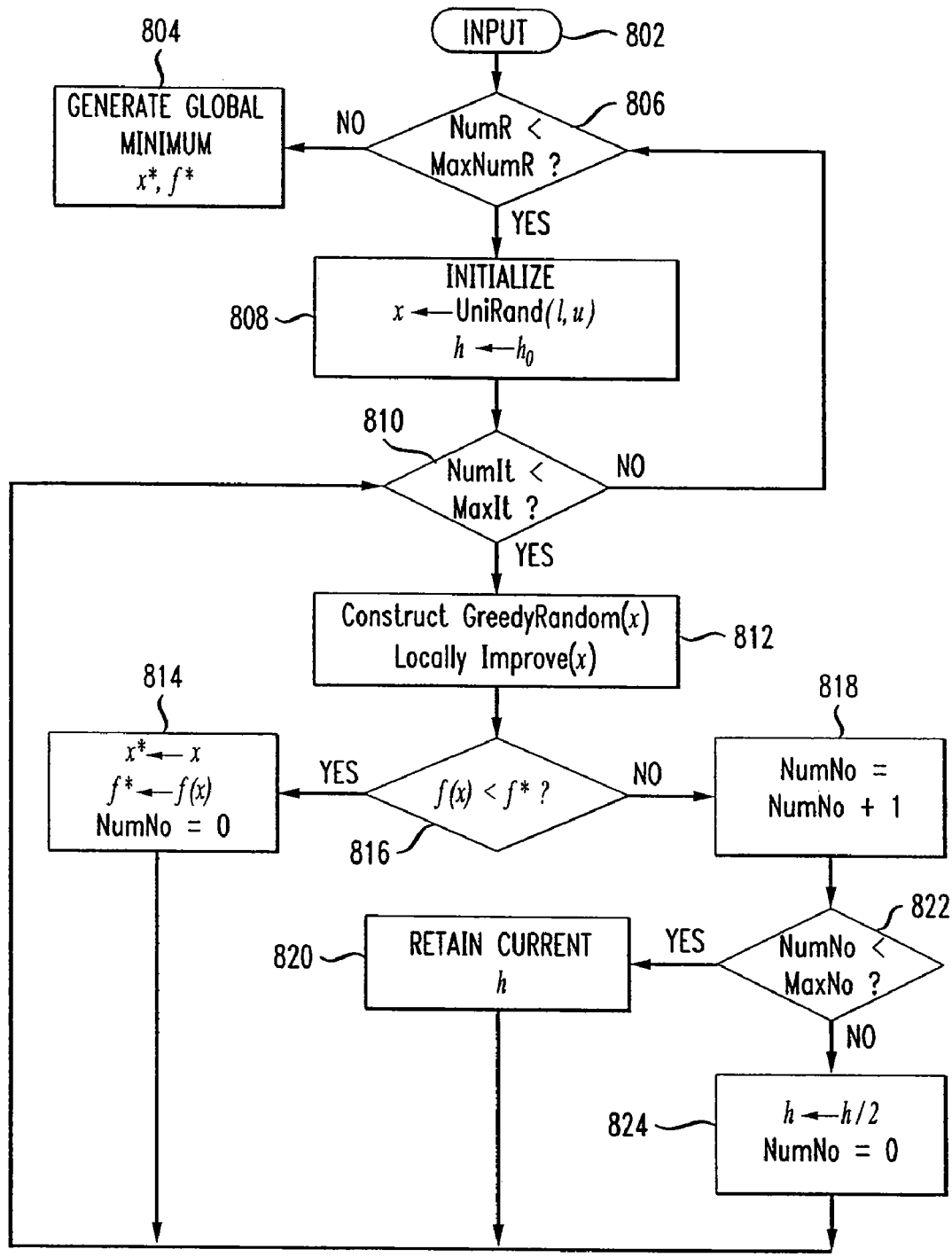
FIG. 8 is a flowchart of a first embodiment of a total phase.

FIG. 8 shows a flowchart for an embodiment of the total phase. In step 802, input variables are specified. These input variables comprise two groups. The first group pertains to the problem being solved:

x=input vector
$f( )$=function to be minimized (formally called the objective function)
n=dimension of vector x
l=lower bound
u=upper bound.

The second group pertains to the C-GRASP execution:

MaxNumR=maximum number of times to run a major iteration. This is equivalent to the number of initial randomly chosen points in the domain S. These are the processes used to generate a global minimum.

MaxIt=maximum number of times to run a minor iteration. This is equivalent to the number of cycles, at each initial point, of a construction phase followed by a local-improvement phase. These are the processes used to generate a local minimum.

$h_o$=initial value of discretization parameter h

MaxNo=maximum number of consecutive minor iterations at the current value of h with no improvement. After this maximum number has been reached, the value of h is reduced.

MaxD=maximum number of directions to be tried in local-improvement phase

α=parameter used in determining the restricted candidate list.

Once the input parameters have been specified, NumR is compared to MaxNumR in step 806. The value NumR tracks the number of the runs of a major iteration. The value NumR is initially set to 0, and the process continues to step 808. In this step, a starting point x is initialized from a uniform random distribution of points within the domain S bounded by l, u. The discretization parameter h is initialized to a value $h_0$.

In step 810, NumIt, which tracks the number of minor iterations, is compared with MaxIt. The value of NumIt is initially set to 0, and the process continues to step 812. In this step, the C-GRASP construction and local-improvement phases, discussed above, are executed to generate a solution x, $f(x)$. In step 816, this value of $f(x)$ is compared to $f^*$, the current minimum value of $f(x)$. The value of $f^*$, is initially set to ∞. If the new value of $f(x)$ is less than $f^*$, the new value is an improved value. In step 814, $x^*$ is set to the current value of x, and $f^*$ is set to the current value of $f(x)$. The parameter NumNo counts the number of times that step 812 has not generated an improved value. In step 814, NumNo is reset to 0. After the completion of step 814, the process returns to step 810. If the maximum number of minor iterations has not been reached, the process in step 812 attempts to generate a further improvement. Improvement continues as long as the newly generated $f(x)$ is less than the current $f^*$. Even if improvement continues to occur with each iteration, however, the improvement process will terminate when the maximum number of minor iterations has been completed.

Referring back to step 816, if there is no improvement, then, in step 818, the value of NumNo is incremented by one. In step 822, the value NumNo is compared with MaxNo, which is the user-defined maximum permissible number of minor iterations at the current value of h with no improvement. If the maximum number has not been reached, then, in step 820, the current value of h is retained, and the process returns to step 810 for another iteration, until the maximum number MaxIt has been executed. Referring back to step 822, if MaxNo has been reached, then, in step 824, the value of h is reduced to h←h/2 to increase the probability of improvement. NumNo is reset to 0. The process then returns to step 810 for another minor iteration, until the maximum number of minor iterations has been executed. In step 810, when the maximum number of minor iterations has been executed (NumIt=MaxIt), the local search is completed. The local minimum $x^*$, $f^*$ is stored.

The process then returns to step 806, where the local search is repeated for another initial point. In step 806, when the number of major iterations NumR reaches the maximum number MaxNumR, the overall process stops, and, in step 804, the global minimum $x^*$, $f^*$ is generated from the minimum of the set of local minima.

The above embodiments may be enhanced to provide faster execution. Enhancements to all three phases (construction phase, local-improvement phase, and total phase) are described herein.

Figure 9A:
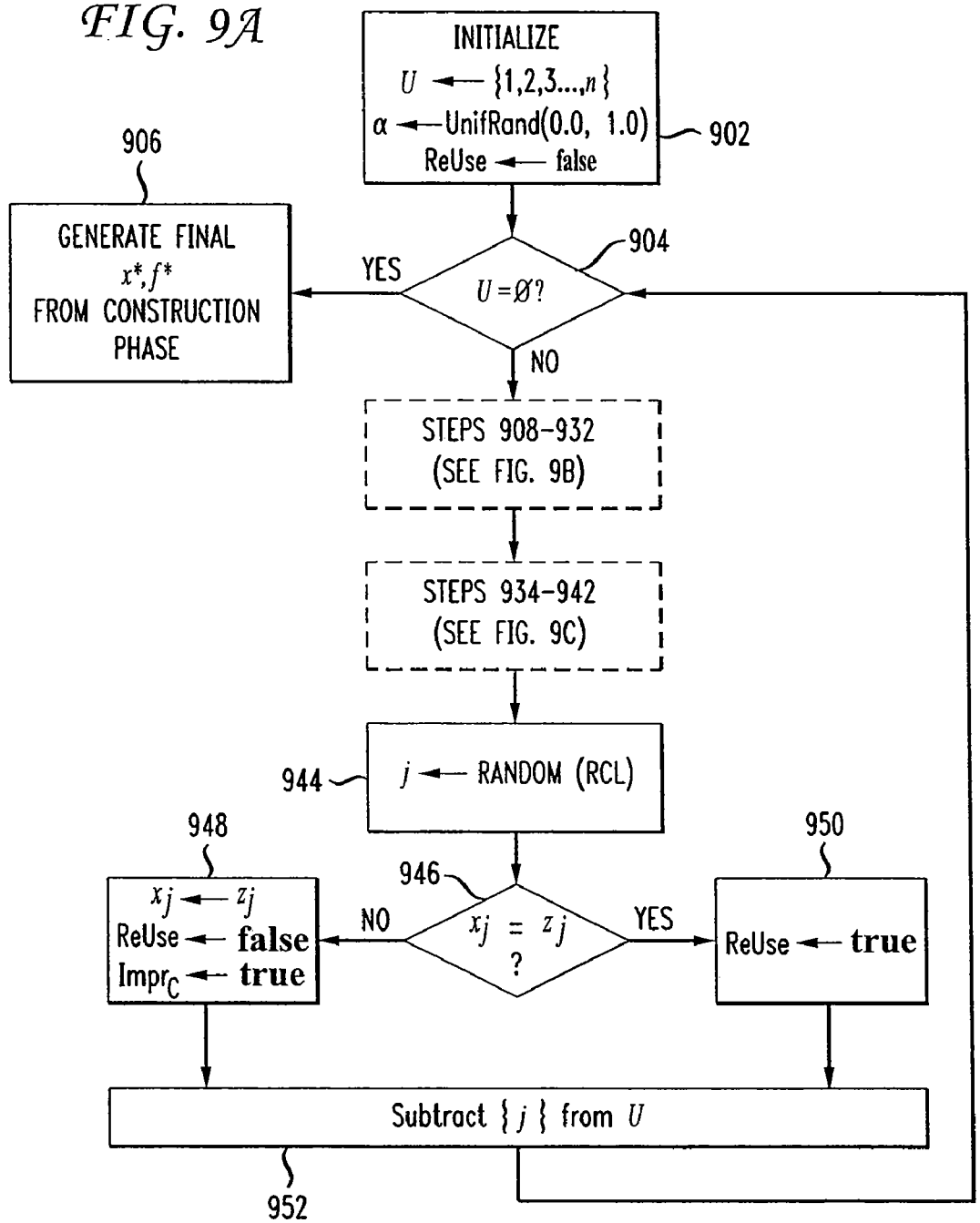
Figure 9B:
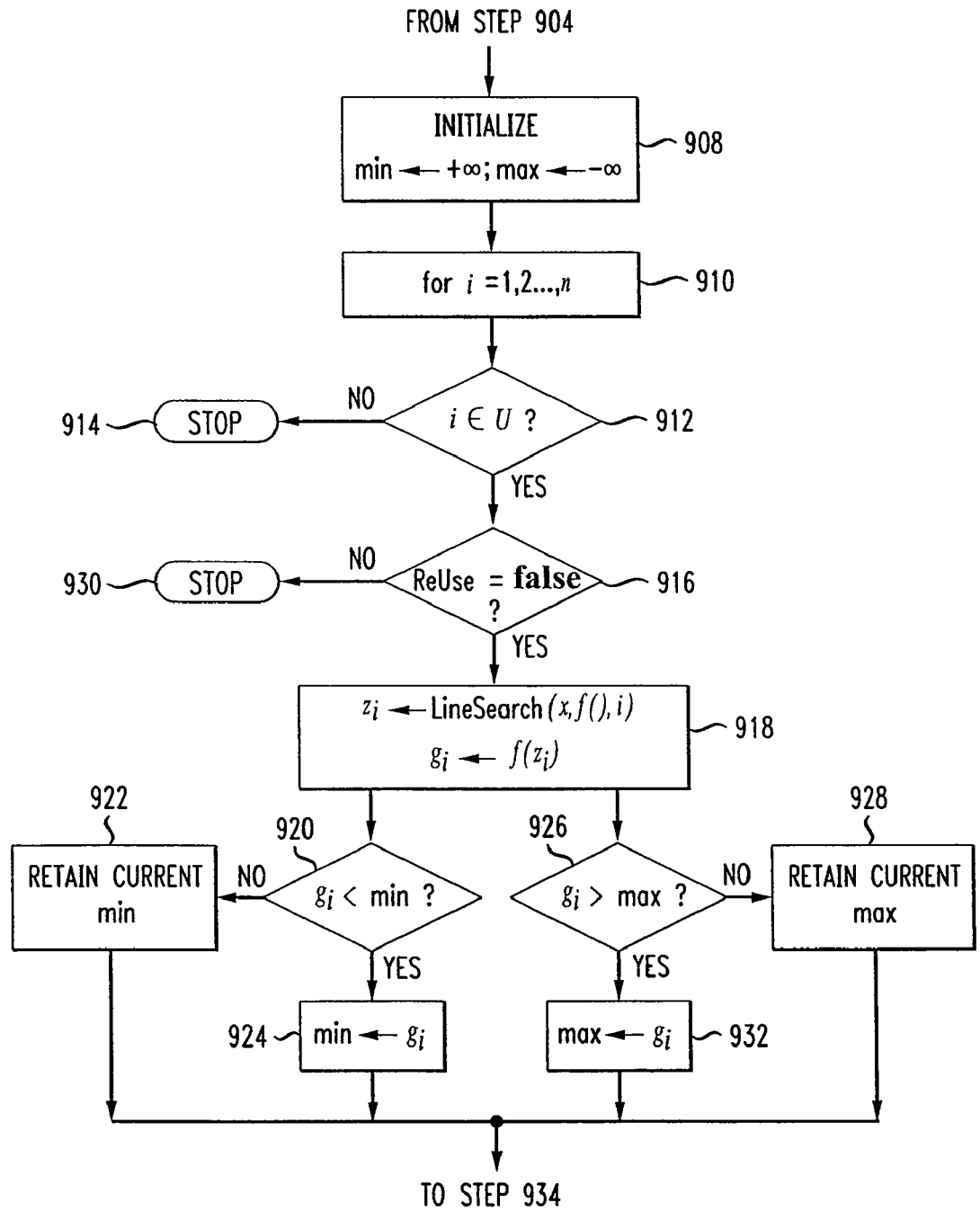

FIGS. 9A-9C show a flowchart of the enhanced construction phase, which takes an initial solution x as an input. In step 902, a set of coordinates U is initialized to U←{1, 2, ..., n}, where n is the dimension of x. A parameter $\alpha$ used in construction of a restricted candidate list is initialized; $\alpha$←UnifRand (0.0,1.0), which refers to a uniform random distribution of numbers over the interval $0 \leq \alpha \leq 1$. The parameter ReUse, defined below, is also initialized; ReUse←false.

In step 904, U is checked to see whether it is null, U=∅. If it is not, the process continues to step 908, in which the variables min and max are initialized: min←+∞; max←−∞. In step 910, steps 912-932 are iterated for i=1, 2, ..., n. In step 912, i is checked to see whether it is an element of U. If it is, the process continues to step 916. If it is not, the process stops in step 914 for that value of i. In step 916, the ReUse parameter, discussed below in relation to step 950, is checked. If it is false, the process stops in step 930. If it is true, the process continues to step 918.

In step 918, a line search is conducted to determine the minimum value of $f(x)$ as the i-th coordinate of x is varied while the other n−1 coordinates are held fixed. The value of the i-th coordinate which minimizes $f(x)$ is stored as the variable $z_i$. The corresponding function $f(z_i)$ is stored as the variable $g_i$. In step 920, the current minimum value of $g_i$, denoted min, is compared with the current value $g_i$. If $g_i<$min, then in step 924, min is set to $g_i$; min←$g_i$. If $g_i$ is not less than min, then, in step 922, the current value is retained. In step 926, the current maximum value of $g_i$, denoted max, is compared with $g_i$. If $g_i>$max, then in step 932, max is set to $g_i$; max←$g_i$. If $g_i$ is not greater than max, then, in step 928, the current value of max is retained. Upon completion of all iterations in step 910, min is the best (minimum) value of $g_i$ for all values of i, and max is the worst (maximum) value of $g_i$ for all values of i.

After the line search has been performed for each unfixed coordinate, a restricted candidate list (RCL) is formed that contains the unfixed coordinates i whose corresponding $g_i$ meets a user-defined condition. In step 934, RCL is initialized to the null set; RCL←∅. In step 936, steps 938-942 are iterated for i=1, 2, ..., n. In step 938, if the following condition is met:

$i \in U$ AND $g_i \leq$ min+$\alpha$:(max−min)

where $\alpha$ was generated from a random distribution in step 902, then, in step 942, i is added to RCL. If the condition is not met, then, in step 940, the value is not added to RCL.

In step 944, j is chosen at random from RCL; j←Random (RCL). Choosing a coordinate in this way ensures randomness in the construction phase. In step 946, if $x_j=z_j$, then, in step 950, ReUse←true. Under these circumstances, there is no need to repeat the line search in that direction. Instead, the previously generated value may be reused. Computation time is thereby reduced. In step 946, if $x_j=z_j$ is not true, the process continues to step 948, in which $x_j$←$z_j$; ReUse←false; and Impr$_C$←true. The parameter Impr$_C$ tracks whether the construction phase has generated an improved value. It will be used below in the enhanced total phase. If it has generated an improved value, then Impr$_C$←true. In step 952, the value {j} is then removed from U. The process then returns to step 904, and steps 908-952 are iterated until all values of j have been chosen. At this time, U=∅, and in step 906, the final value of $x^*=\{z_1, z_2, ... z_n\}$, $f^*=f(x^*)$ from the construction phase is generated.

Figure 10:
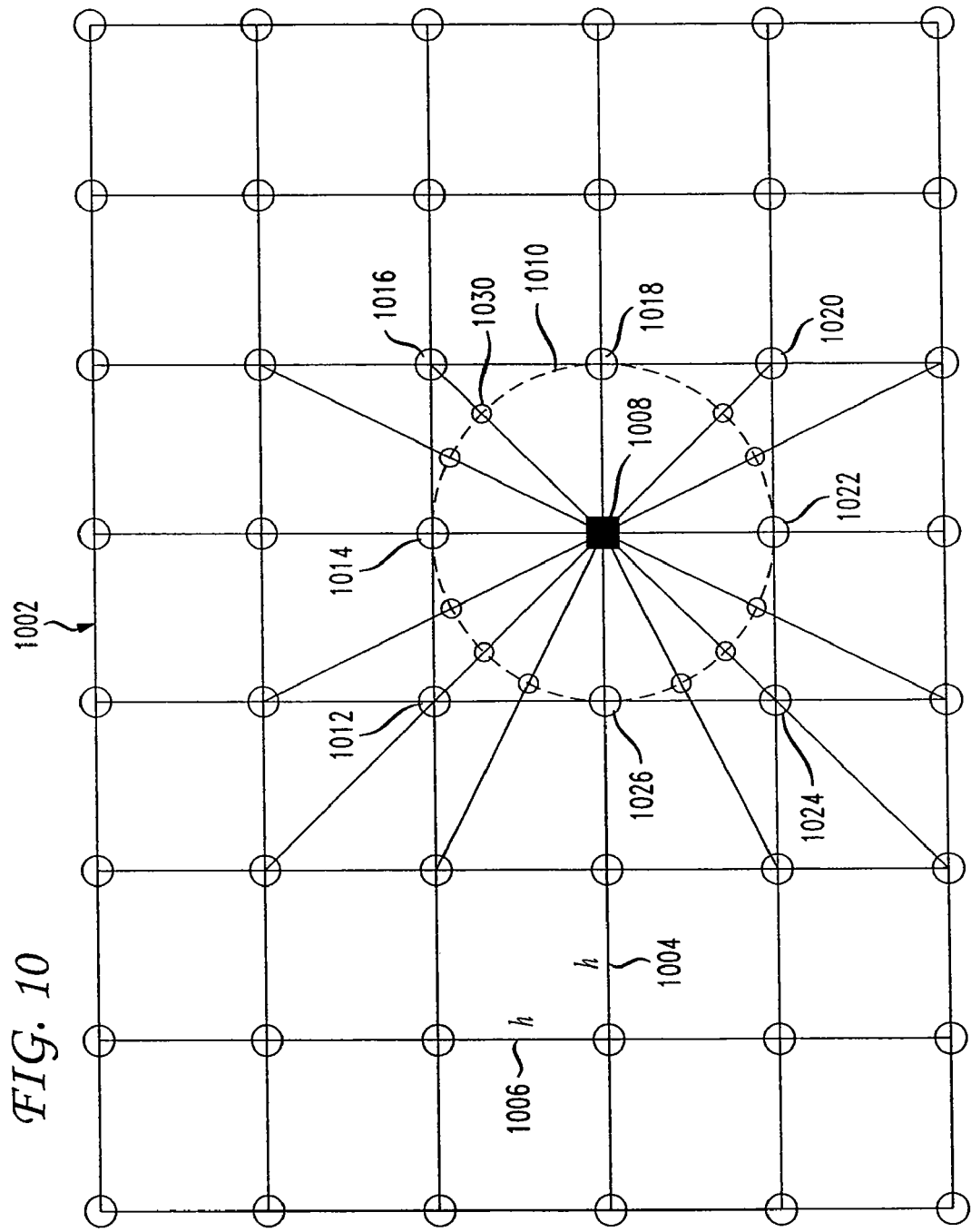
FIG. 10 is a graphical representation of a second embodiment of a local neighborhood search.

The enhanced local-improvement phase uses an enhanced local neighborhood search method. FIG. 10 is a graphical comparison of the first embodiment of the local neighborhood search method discussed above and the enhanced method. The domain S 1002 is mapped into square grids with length 1004 and height 1006 equal to h. The initial point $x_0$ is represented by the square 1008 in the domain S 1002. In the first embodiment, the search points are restricted to those points in the domain S that, in each of the coordinate directions, are integer steps of size h away from the initial point $x_0$ 1008. These search points are represented by points on the corners of the square grid, 1012-1026. In the enhanced method, this geometry is relaxed, allowing for more efficient search patterns. The enhanced search method uses the concepts of an h-neighborhood and an h-local minimum. In FIG. 10, the h-neighborhood of the initial point $x_0$ 1008 is represented by the points on the circular boundary 1010 (indicated by the dashed line). This neighborhood is referred to as $B_h(x)$. Previous points 1014, 1018, 1022, and 1026 are included in the neighborhood. The additional points in the neighborhood are represented by small circles on the circular boundary 1010. Point 1030 is a representative point. The value $\bar{x}$ is an h-local minimum if $f(\bar{x}) \leq f(x)$ for all x in $B_h(x)$.

Formally, the neighborhood comprising the search points at the corners of the square grids about a point $\bar{x}$, is defined by the set of points:

$S_h(\bar{x}) = \{x \in S | l \leq x \leq u, x = \bar{x} + \tau h, \tau \in Z^n\}$, where Z indicates the space of integers.

The search points in the h-neighborhood are defined by the set of points:

$B_h(\bar{x}) = \{x \in S | x = \bar{x} + h(x^j - \bar{x})/\|, x^j \in S_h(\bar{x}) \setminus \{\bar{x}\}\}$ The points in $B_h(\bar{x})$ are the projection of the points in $S_h(\bar{x})\setminus\{\bar{x}\}$ onto the hyper-sphere of radius h, centered at $\bar{x}$.

Figure 11:
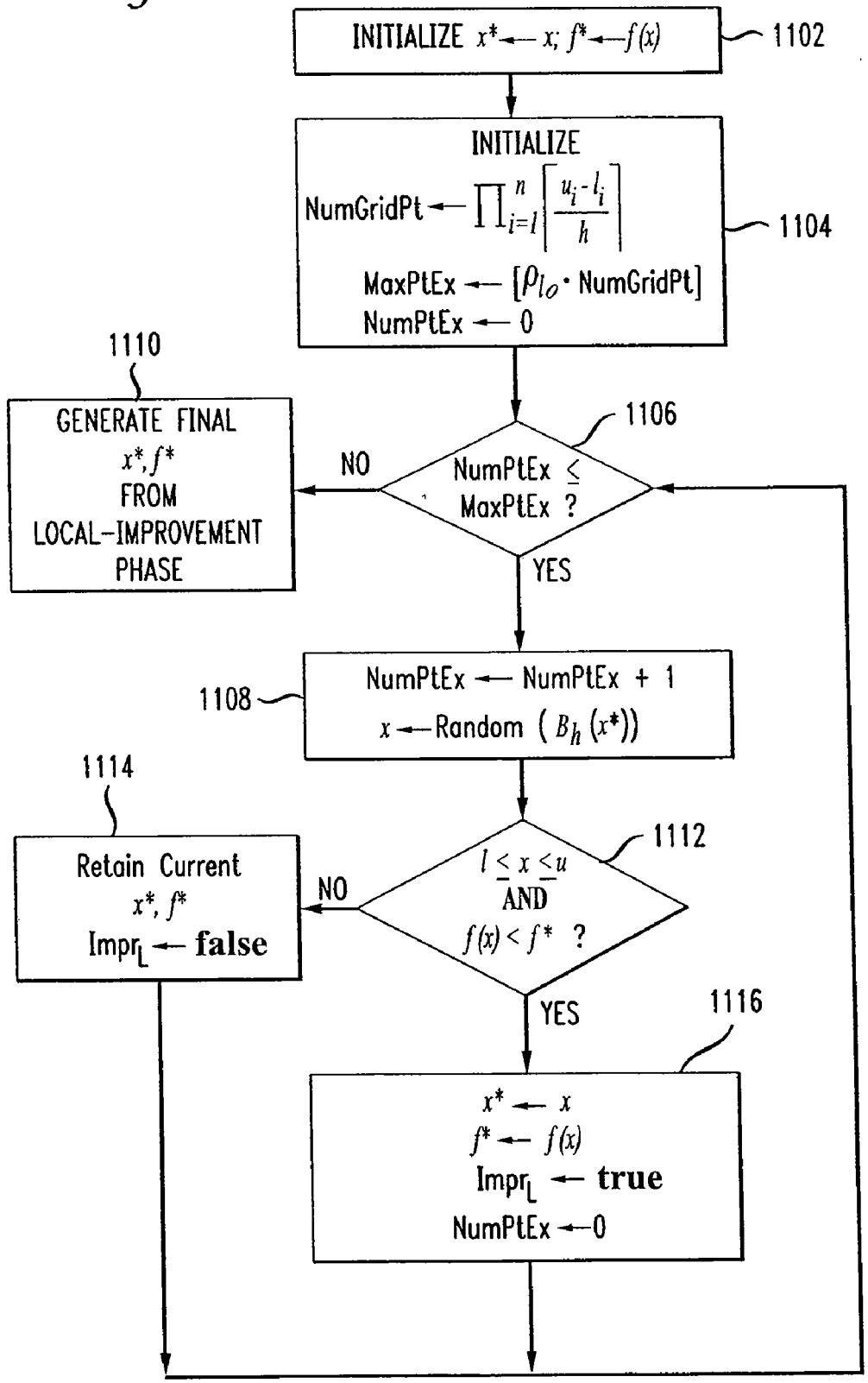
FIG. 11 is a flowchart of a second embodiment of a local-improvement phase.

The flowchart in FIG. 11 shows the enhanced local-improvement phase. In step 1102, the best values $x^*$, $f^*$ are initialized to the current values; $x^* \leftarrow x$ and $f^* \leftarrow f(x)$. In step 1104, NumGridPt is the number of grid points in the h-neighborhood, based on the current value of the discretization parameter h. Since the number of points may be very large, a user-defined parameter MaxPtEx specifies the number of points in $B_h(x^*)$ to examine to ensure $x^*$ is an h-local minimum with probability $\rho_{lo}$, a user-defined parameter. Herein, "examine" means to generate a trial solution at a point in the h-neighborhood. NumPtEx, the number of points which have been examined, is initialized to 0. In step 1106, if NumPtEx≦MaxPtEx, the process continues to step 1108. In step 1108, NumPtEx is incremented by 1, and x is randomly chosen from $B_h(x^*)$. In step 1112, if x lies within the domain $1 \leq x \leq u$ AND $f(x) < f(x^*)$, then, in step 1116, $x^* \leftarrow x$ and $f^* \leftarrow f(x)$. $Impr_L$ is set to true. The parameter $Impr_L$ tracks whether the local-improvement phase has generated an improved value. It will be used below in the enhanced total phase. If it has generated an improved value, then $Impr_L \leftarrow$ true. NumPtEx is reset to 0. In step 1112, if the conditions are not met, then, in step 1114, the current values of $x^*$, $f(x^*)$ are retained, and $Impr_L \leftarrow$ false. Returning to step 1106, the local-improvement procedure is terminated upon finding a solution x that is an h-local minimum with probability $\rho_{lo}$. At that time, in step 1110, the final values of $x^*$, $f(x^*)$ are generated from the local-improvement phase.

Figure 12:
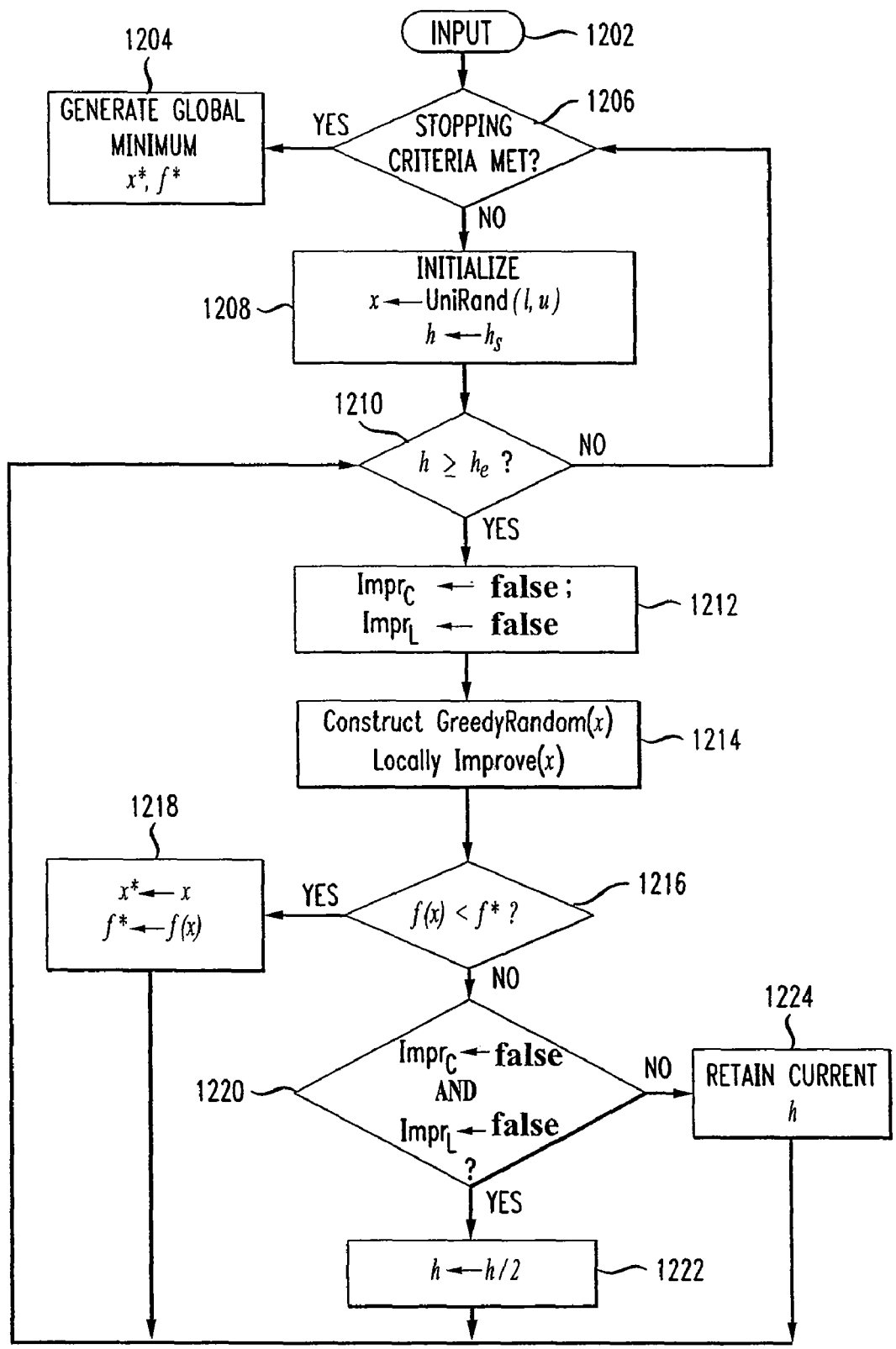
FIG. 12 is a flowchart of a second embodiment of a total phase.

FIG. 12 shows a flowchart for an embodiment of an enhanced total phase. In step 1202, input variables are specified. These input variables comprise two groups. The first group pertains to the problem being solved:
x=input vector
$f(\ )$=function to be minimized (formally called the objective function)
n=dimension of vector x
l=lower bound
u=upper bound.
The second group pertains to the C-GRASP execution:
$h_s$=starting value of discretization parameter
$h_e$=ending value of discretization parameter. The ending value is less than the starting value. The discretization parameter will be reduced from $h_s$ to $h_e$ as needed to find improved solutions.
$\rho_{lo}$=probability that the final solution generated from the local-improvement phase is an h-local minimum.

In step 1206, the process checks whether stopping criteria have been met. In the first embodiment discussed above, the stopping criteria in FIG. 8, step 806, was determined by MaxNumR, the maximum number of runs of major iterations to complete the overall process. In some instances, more advantageous stopping criteria may be used. In step 1206, the stopping criteria is intentionally left generic to accommodate different stopping criteria. In one embodiment of the invention, the stopping criteria is Hart's sequential stopping rule. In the first iteration, stopping criteria are not met, and the process continues to step 1208, in which a starting point x is initialized from a uniform random distribution of points within the domain S bounded by l, u. The discretization variable h is initialized to a starting value $h_s$. In step 1210, the current value of h is compared with the ending value $h_e$. In steps described below, the value of h is successively reduced until the value $h_e$ is reached. If $h \geq h_e$, the process continues to step 1212. In this step, two parameters are initialized. The parameters, $Impr_C$ and $Impr_L$, track whether there has been an improvement in the construction phase and an improvement in the local-improvement phase, respectively. If there has been an improvement, the value is true. In the first iteration, these parameters are set to false.

Continuing to step 1214, the C-GRASP enhanced construction and enhanced local-improvement phases are executed to generate a solution x, $f(x)$. In step 1216, $f(x)$ is compared with the current best (minimum) value $f^*$. The value $f(x)$ is initialized to $\infty$, and the process proceeds to step 1218, in which the best values are set to the current values; $x^* \leftarrow x$ and $f^* \leftarrow f(x)$. The process then returns to step 1210. Referring back to step 1216, if there has been no improvement, the process continues to step 1220. If there has been no improvement in both the construction phase AND the local-improvement phase, then, in step 1222, the value of h is reduced by a factor of two to improve the probability of improvement in the next iteration; $h \leftarrow h/2$. If there has been improvement in one of the phases, then, in step 1224, the current value of h is retained.

The process then returns to step 1210 for the next iteration. The iterations continue until h drops below the ending value $h_e$. In the first embodiment, shown in FIG. 8, step 810, the iterations stopped after a user-defined maximum number of iterations had been completed. In the enhanced embodiment, the iterations continue until a minimum grid size has been attained. At this point, the process returns to step 1206, and the major iteration is repeated until the stopping criteria has been met. At that point, in step 1204, the global minimum, $x^*$, $f(x^*)$, is generated from the set of local minima.

Figure 13:
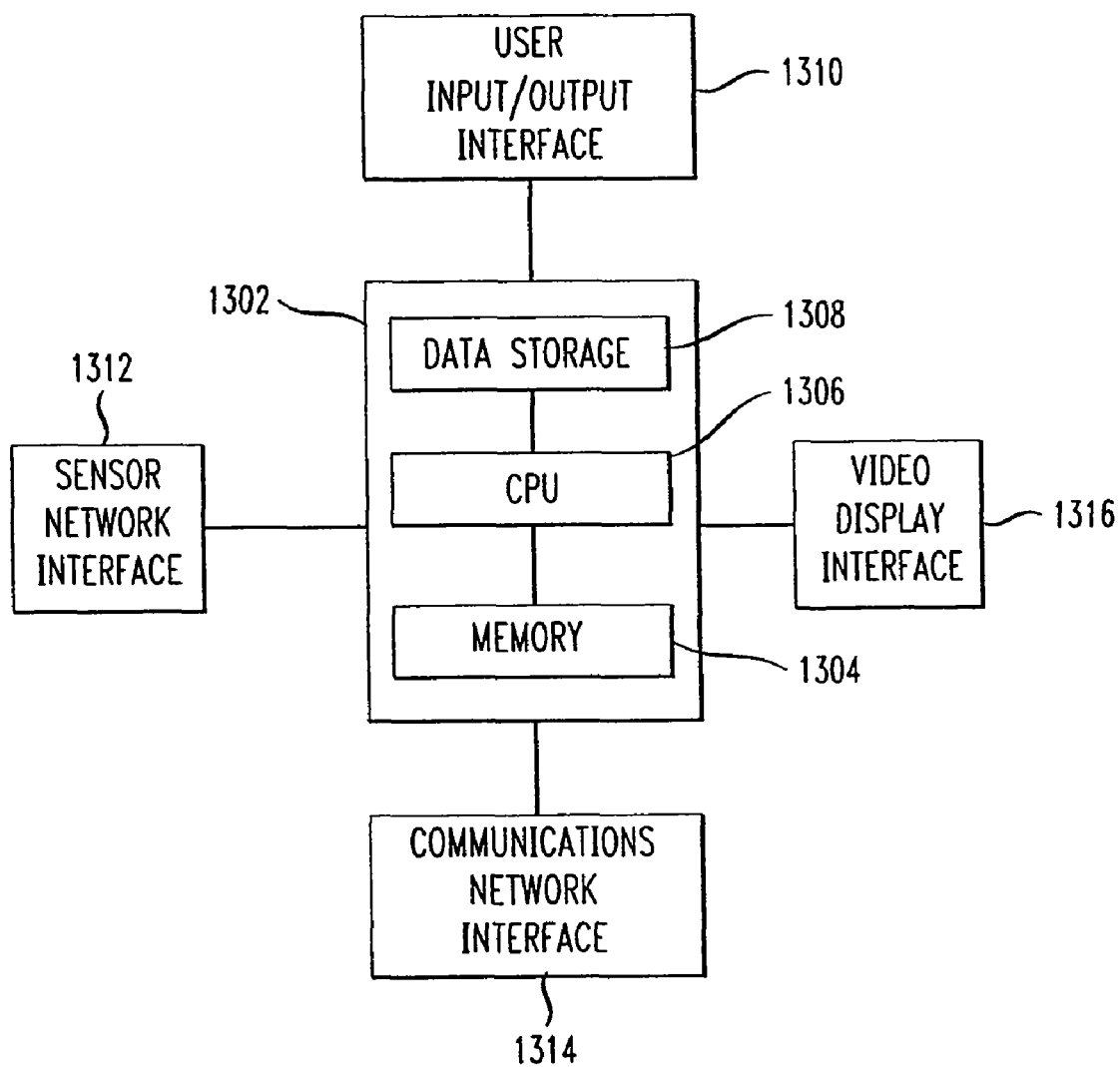
FIG. 13 is a schematic of an embodiment of a computer system for performing sensor registration and performing C-GRASP.

One embodiment of a data processing system which performs sensor registration and C-GRASP processing may be implemented using a computer. As shown in FIG. 13, computer 1302 may be any type of well-known computer comprising a central processing unit (CPU) 1306, memory 1304, data storage 1308, and user input/output interface 1310. Data storage 1308 may comprise a hard drive or non-volatile memory. User input/output interface 1310 may comprise a connection to a keyboard or mouse. As is well known, a computer operates under control of computer software which defines the overall operation of the computer and applications. CPU 1306 controls the overall operation of the computer and applications by executing computer program instructions which define the overall operation and applications. The computer program instructions may be stored in data storage 1308 and loaded into memory 1304 when execution of the program instructions is desired. Computer 1302 may further comprise a communications network interface 1314, sensor network interface 1312, and video display interface 1316. Sensor network interface 1312 may transform incoming signals to signals capable of being processed by CPU 1306. Video display interface 1316 may transform signals from CPU 1306 to signals which may drive a video controller. Communications network interface 1314 may comprise a connection to an Internet Protocol (IP) network. Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A measurement system comprising:
a first sensor configured to sense a first set of measurements from a first plurality of objects;
a second sensor configured to sense a second set of measurements from a second plurality of objects; and
a computer comprising:
   a sensor network interface configured to receive the first set of measurements and the second set of measurements;
   a central processing unit configured to execute computer program instructions; and
   a data storage storing computer program instructions defining:
      generating a likelihood function associating a data element from the first set of measurements with a data element from the second set of measurements;
      generating a systematic error function based at least in part on the likelihood function;
      minimizing the systematic error function; and,
      assigning an object from the first plurality of objects to an object from the second plurality of objects, based at least in part on the minimized systematic error function.

2. The measurement system of claim 1, wherein the computer program instructions defining assigning comprise computer program instructions defining:
assigning using a linear assignment method.

3. The measurement system of claim 1, wherein the computer program instructions defining minimizing the systematic error function comprise computer instructions defining:
generating a global minimum of the systematic error function.

4. The measurement system of claim 1, wherein the computer program instructions defining minimizing the systematic error function comprise computer instructions defining:
using a Continuous Greedy Randomized Adaptive Search Procedure.

* * * * *